US009322402B2

(12) United States Patent
Marette

(10) Patent No.: US 9,322,402 B2
(45) Date of Patent: Apr. 26, 2016

(54) DOVE-TAIL CLAMP

(71) Applicant: J-MAC TOOL, INC., Fort Worth, TX (US)

(72) Inventor: Michael David Marette, Aledo, TX (US)

(73) Assignee: J-Mac Tool, Inc., Fort Worth, TX (US)

( * ) Notice: Subject to any disclaimer, the term of this patent is extended or adjusted under 35 U.S.C. 154(b) by 407 days.

(21) Appl. No.: 13/678,067

(22) Filed: Nov. 15, 2012

(65) Prior Publication Data

US 2013/0068092 A1 Mar. 21, 2013

Related U.S. Application Data

(63) Continuation-in-part of application No. 12/659,084, filed on Feb. 24, 2010, now Pat. No. 8,998,593, and a continuation-in-part of application No. PCT/US2012/064806, filed on Nov. 13, 2012.

(51) Int. Cl.
| *F04B 53/14* | (2006.01) |
| *F16J 13/00* | (2006.01) |
| *F16J 1/12* | (2006.01) |
| *F04B 53/00* | (2006.01) |
| *F04B 53/22* | (2006.01) |

(52) U.S. Cl.
CPC ............ *F04B 53/147* (2013.01); *F04B 53/007* (2013.01); *F04B 53/14* (2013.01); *F04B 53/22* (2013.01); *F16J 1/12* (2013.01); *F16J 13/00* (2013.01)

(58) Field of Classification Search
CPC ...... F04B 53/147; F04B 53/22; F04B 53/144; F04B 53/145; F04B 53/146; F16J 1/12
USPC ................ 417/454; 92/84, 129, 187
See application file for complete search history.

(56) References Cited

U.S. PATENT DOCUMENTS

| 2,841,092 A | 7/1958 | Whiteman et al. |
| 3,049,082 A | 8/1962 | Barry |
| 3,276,390 A | 10/1966 | Bloudoff et al. |
| 3,373,695 A | 3/1968 | Yohpe |
| 3,427,988 A | 2/1969 | Redman et al. |

(Continued)

FOREIGN PATENT DOCUMENTS

EP    1059446 A2    12/2000

OTHER PUBLICATIONS

International Search Report and Written Opinion in related PCT Application No. PCT/US2012/064806, mailed Jan. 28, 2013, 9 pages.

*Primary Examiner* — Justin Jonaitis
*Assistant Examiner* — Charles Nichols
(74) *Attorney, Agent, or Firm* — James E. Walton

(57) ABSTRACT

A dove-tail clamp assembly configured to couple a plunger and a pony rod for operation within a fluid end. The clamp assembly using a flange portion extending from the plunger and the pony rod. A clamp within the clamp assembly engages the flanges in the plunger and the pony rod in a non-threaded relationship to permit the pony rod to induce a reciprocating movement of the plunger within the fluid end. The flange portions may be integrally coupled to the plunger and the pony rod in one embodiment. In another embodiment, the flange portions may be threadedly inserted into existing bores in the plunger and the pony rod. The clamp assembly may include a deflector and an alignment pin.

14 Claims, 15 Drawing Sheets

(56) References Cited

U.S. PATENT DOCUMENTS

| | | | |
|---|---|---|---|
| 3,489,098 | A | 1/1970 | Roth et al. |
| 3,801,234 | A | 4/1974 | Love et al. |
| 3,891,356 | A | 6/1975 | Christ |
| 4,456,440 | A | 6/1984 | Korner |
| 4,508,133 | A | 4/1985 | Hamid |
| 4,520,837 | A | 6/1985 | Cole et al. |
| 4,527,961 | A | 7/1985 | Redwine et al. |
| 4,758,135 | A | 7/1988 | Woodward et al. |
| 4,768,933 | A | 9/1988 | Stachowiak |
| 4,771,801 | A | 9/1988 | Crump et al. |
| 4,861,241 | A | 8/1989 | Gamboa et al. |
| 4,878,815 | A | 11/1989 | Stachowiak |
| 4,940,261 | A | 7/1990 | Somers Vine |
| 5,073,096 | A | 12/1991 | King et al. |
| 5,102,312 | A | 4/1992 | Harvey |
| 5,253,987 | A | 10/1993 | Harrison |
| 5,362,215 | A | 11/1994 | King |
| 5,507,219 | A * | 4/1996 | Stogner ............................ 92/128 |
| 5,605,449 | A | 2/1997 | Reed |
| 5,636,975 | A | 6/1997 | Tiffany et al. |
| 6,186,413 | B1 | 2/2001 | Lawson |
| 6,382,940 | B1 | 5/2002 | Blume |
| 6,544,012 | B1 | 4/2003 | Blume |
| 6,623,259 | B1 | 9/2003 | Blume |
| 6,868,774 | B2 * | 3/2005 | McCullough et al. ........... 92/153 |
| 6,910,871 | B1 * | 6/2005 | Blume ........................... 417/571 |
| 7,186,097 | B1 | 3/2007 | Blume |
| 7,341,435 | B2 | 3/2008 | Vicars |
| 7,857,517 | B1 | 12/2010 | Vicars |
| 7,891,374 | B2 | 2/2011 | Vicars |
| 7,895,919 | B2 | 3/2011 | Vicars |
| 7,909,057 | B1 | 3/2011 | Vicars |
| 7,950,322 | B2 | 5/2011 | Vicars |
| 8,528,462 | B2 * | 9/2013 | Pacht .............................. 92/128 |
| 2002/0141884 | A1 | 10/2002 | Sperry |
| 2003/0202892 | A1 | 10/2003 | Aly Abdel El Rahman Orfi et al. |
| 2003/0235508 | A1 | 12/2003 | Vicars |
| 2004/0170507 | A1 | 9/2004 | Vicars |
| 2004/0234404 | A1 * | 11/2004 | Vicars ........................... 417/571 |
| 2005/0201881 | A1 | 9/2005 | Jensen et al. |
| 2005/0249615 | A1 | 11/2005 | Jezek |
| 2005/0276708 | A1 | 12/2005 | Miller |
| 2006/0002806 | A1 | 1/2006 | Baxter et al. |
| 2008/0138224 | A1 | 6/2008 | Vicars |
| 2010/0135833 | A1 | 6/2010 | Schwegman |
| 2010/0288958 | A1 | 11/2010 | Vicars |
| 2010/0313703 | A1 | 12/2010 | Vicars |
| 2010/0316314 | A1 | 12/2010 | Vicars |
| 2013/0112073 | A1 * | 5/2013 | Studt et al. ...................... 92/153 |

* cited by examiner

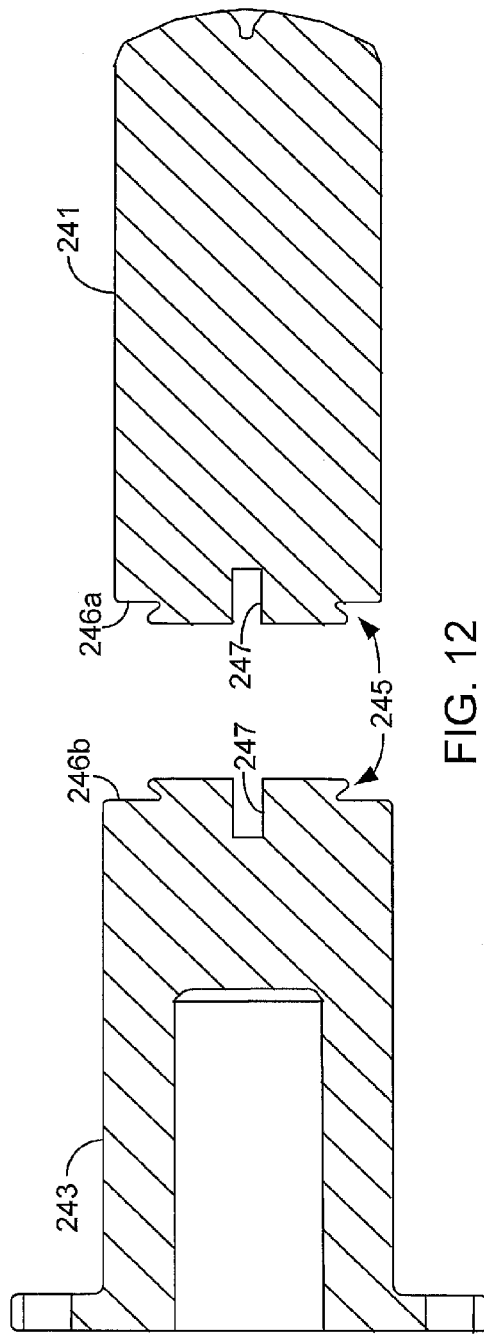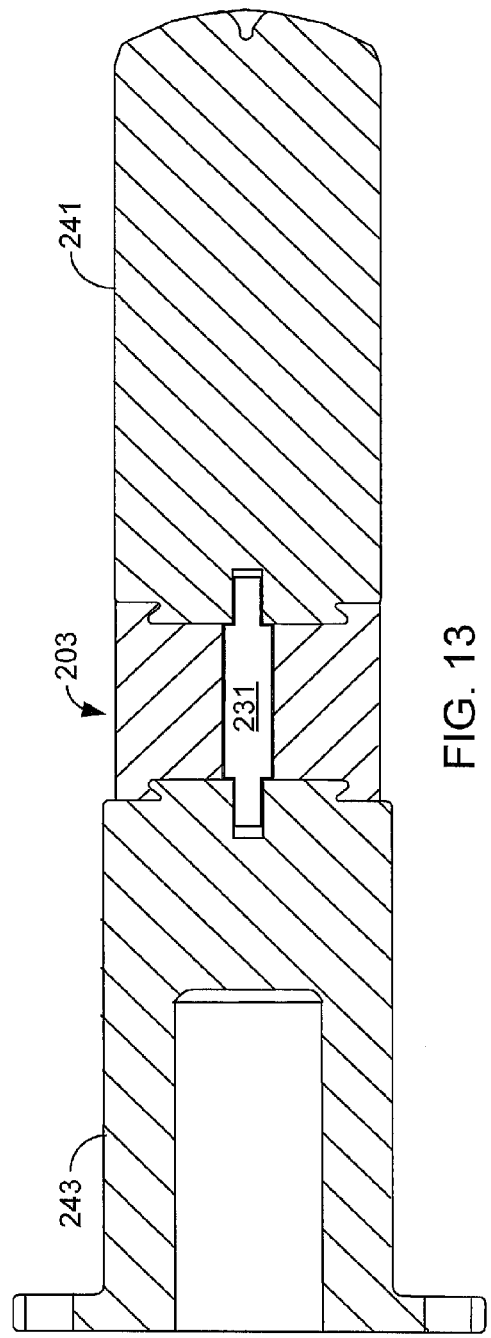

DOVE-TAIL CLAMP

BACKGROUND

1. Field of the Invention

The application relates generally to pumps having a pony rod and a plunger in operative communication with a fluid end and, more particularly, to a tool for coupling the plunger to the pony rod.

2. Description of Related Art

It is difficult to economically produce hydrocarbons from low permeability reservoir rocks. Oil and gas production rates are often boosted by hydraulic fracturing, a technique that increases rock permeability by opening channels through which hydrocarbons can flow to recovery wells. During hydraulic fracturing, a fluid is pumped into the earth under high pressure (sometimes as high as 50,000 PSI) where it enters a reservoir rock and cracks or fractures it. Large quantities of proppants are carried in suspension by the fluid into the fractures. When the pressure is released, the fractures partially close on the proppants, leaving channels for oil and gas to flow.

Specialized pumps are used to deliver fracture fluids at sufficiently high rates and pressures to complete a hydraulic fracturing procedure or "frac job." These pumps are usually provided with fluid ends having both reciprocating plungers that place fluids under pressure and valves that control fluid flow to and from the plungers. Fluid ends have many parts that are releasably fastened to one another so that they can be easily repaired or replaced. For example, plungers are typically threadedly coupled to a pony rod, the pony rod inducing movement of the plunger. It is the connections between the parts and the supporting features for the valves that tend to weaken a fluid end, limiting its pressure rating, and making it susceptible to corrosion, leaks, and cracks under high, cyclical stresses. Thus, fluid ends sometimes fail under load prematurely.

As the plungers reciprocate within the pumping chamber, the plungers cycle between high and low pressures and are subjected to high stress variations. The plungers also rub against sealing elements in the ends of the pumping chambers and, consequently, are worn and abraded by proppants and other materials carried in the pumped fluids. Typically, the plungers are located deep within a fluid end of a pump that is held together by a large number of heavy, threaded fasteners. To access the worn plungers, the fluid end and other pump components must often be disassembled.

Manufacturers have made few provisions in pumps for fixing pump plungers as they wear out. Threaded connections between the pony rod and the plunger are susceptible to loosening during pumping operations, thereby requiring more maintenance. Additionally, the threads may become contaminated and scratched with debris requiring polishing. Although manufacturers provide strong and robust pumps, disassembly of pumps in the field is especially time-consuming and difficult to perform.

Although great strides have been made in fluid ends, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 12 and 13 are illustrative section views of an alternative clamp assembly using an alternative plunger and pony rod having a flange portion.

Figure 1:
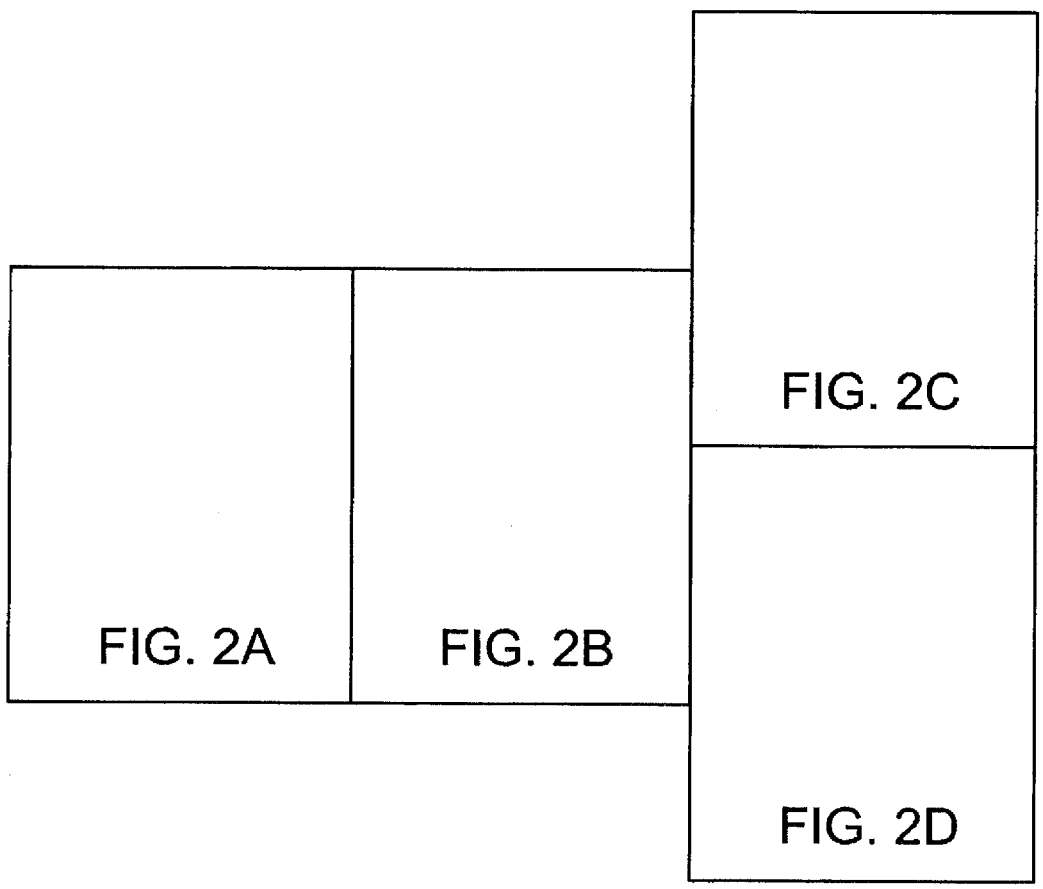
FIG. 1 is a schematic view showing the relative positions of the four drawing sheets carrying FIGS. 2A, 2B, 2C, and 2D.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIGS. 1 and 2 of the drawings, a first embodiment of a fluid end assembly according to the present application is shown at 10. Fluid end assembly 10 includes a pump housing 12 having a plunger bore 14 within which a plunger 16 reciprocates. At its inner end, plunger bore 14 terminates in a pumping chamber 18 that is supplied with fluid from above by a suction passage 20 in pump housing 12. Fluid pressurized by plunger 16 exits pumping chamber 18 downwardly through a discharge passage 22 in pump housing 12. A suction valve 24 in suction passage 20 establishes the one-way flow of fluid from a supply manifold 28 into pumping chamber 18. A discharge valve 26 in discharge passage 22 sets up the one-way flow of fluid from pumping chamber 18 into an outlet passage 30 for release from fluid end assembly 10.

Pump housing 12 is a steel block of suitable size and shape. To lower its weight and increase its strength, housing 12 is provided with a plunger section 32 of reduced height that contains the outer end of plunger bore 14 and is adapted for attachment to the power end of a high-pressure pump 34 by a number of stay rods 36. A suction section 38, containing suction passage 20, is integrally formed with plunger section 32 and extends forwardly and upwardly from plunger section 32. Similarly, a discharge section 40, containing discharge passage 22, is integrally formed with plunger section 32 and suction section 38, and extends forwardly and downwardly from plunger section 32. Suction and discharge sections 38 and 40 generally taper from their inner ends to their outer ends.

Plunger bore 14 is provided within pump housing 12 along a centerline A. At its outer end, plunger bore 14 is widened and partly threaded at 42 to receive a compressible, packing unit 44 and a rotatable gland nut 46 that provide a fluid-tight seal around plunger 16. A number of radial apertures 45 in the gland nut 46 permit gland nut to be easily grasped by a spanner wrench (not shown) and screwed into plunger bore 14. A lubricating port 48 in plunger section 32 permits a lubricating oil to flow under the influence of gravity to plunger 16 at a point between packing unit 44 and gland nut 46 so that plunger 16 can be reciprocated without binding.

Suction passage 20 intersects the top of pumping chamber 18 and has a centerline B. Centerline B is coplanar with centerline A and intersects centerline A at a reference point Z in pumping chamber 18 to define a first obtuse angle α. Suction passage 20 extends from the bottom to the top of suction section 38. Suction passage 20 has a bottom part 20a of relatively small diameter and a helically threaded, top part 20b of large diameter, with each of parts 20a and 20b measuring about half of the length of suction passage 20. The top of part 20a forms a deck 50 upon which a suction valve seat and guide assembly 52, being a feature of suction valve 24, rests. The innermost portion of deck 50, located closest to centerline B, is oriented at right angles to centerline B for optimally transferring forces from valve seat and guide assembly 52 to pump housing 12 so as to reduce the likelihood of fatigue-induced cracks forming in housing 12 at this location.

Discharge passage 22 intersects the bottom of pumping chamber 18 and has a third centerline C. Centerline C is coplanar with centerlines A and B that it intersects at reference point Z where there is a second obtuse angle λ formed between centerlines A and C. Additionally, discharge passage 22 has a top part 22a of relatively small diameter and a helically threaded, bottom part 22b of large diameter. The bottom of part 22a forms a deck 54 upon which a discharge valve seat 56, being a feature of discharge valve 26, rests. The portion of deck 54 closest to centerline C is oriented at right angles to centerline C for optimally transferring forces from valve seat 56 to pump housing 12 in a manner that reduces the likelihood of fatigue-induced cracks forming in housing 12 at this location.

Figure 2A:
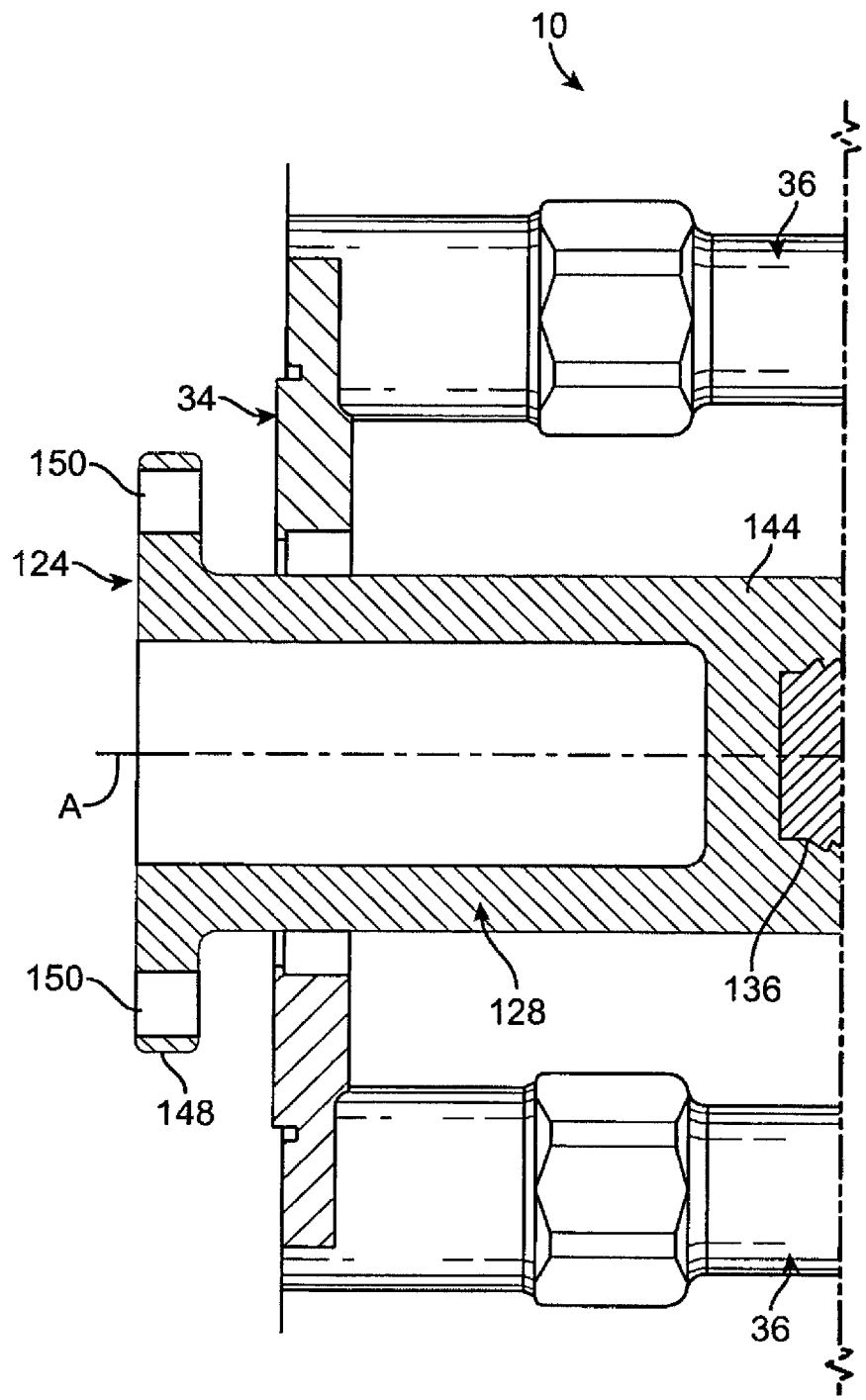
FIG. 2A is a cross-sectional view of the left portion of a first embodiment of the fluid end assembly according to the preferred embodiment of the present application.
Figure 2B:
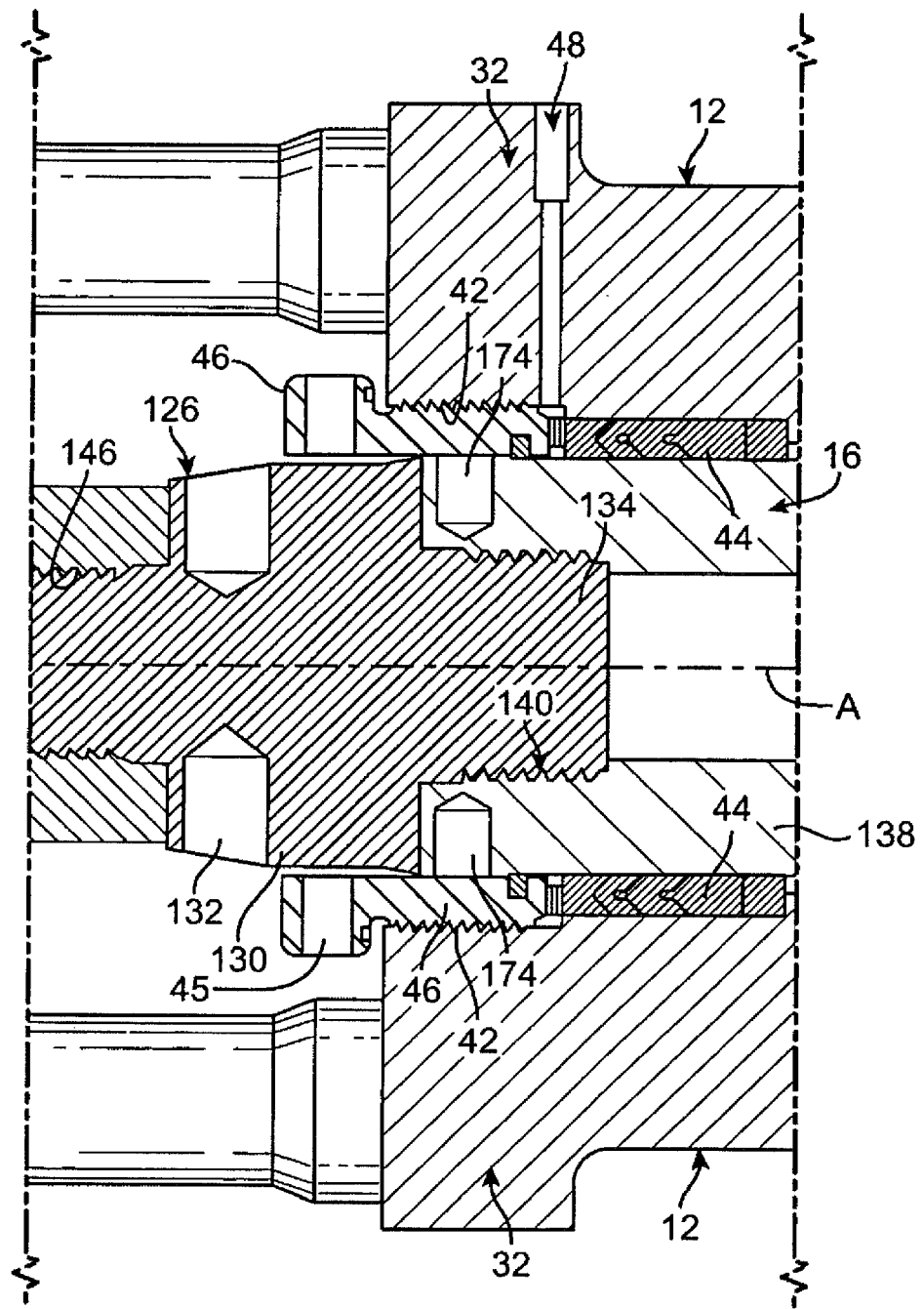
FIG. 2B is a cross-sectional view of a central portion of the first embodiment of the fluid end assembly according to the preferred embodiment of the present application.
Figure 2C:
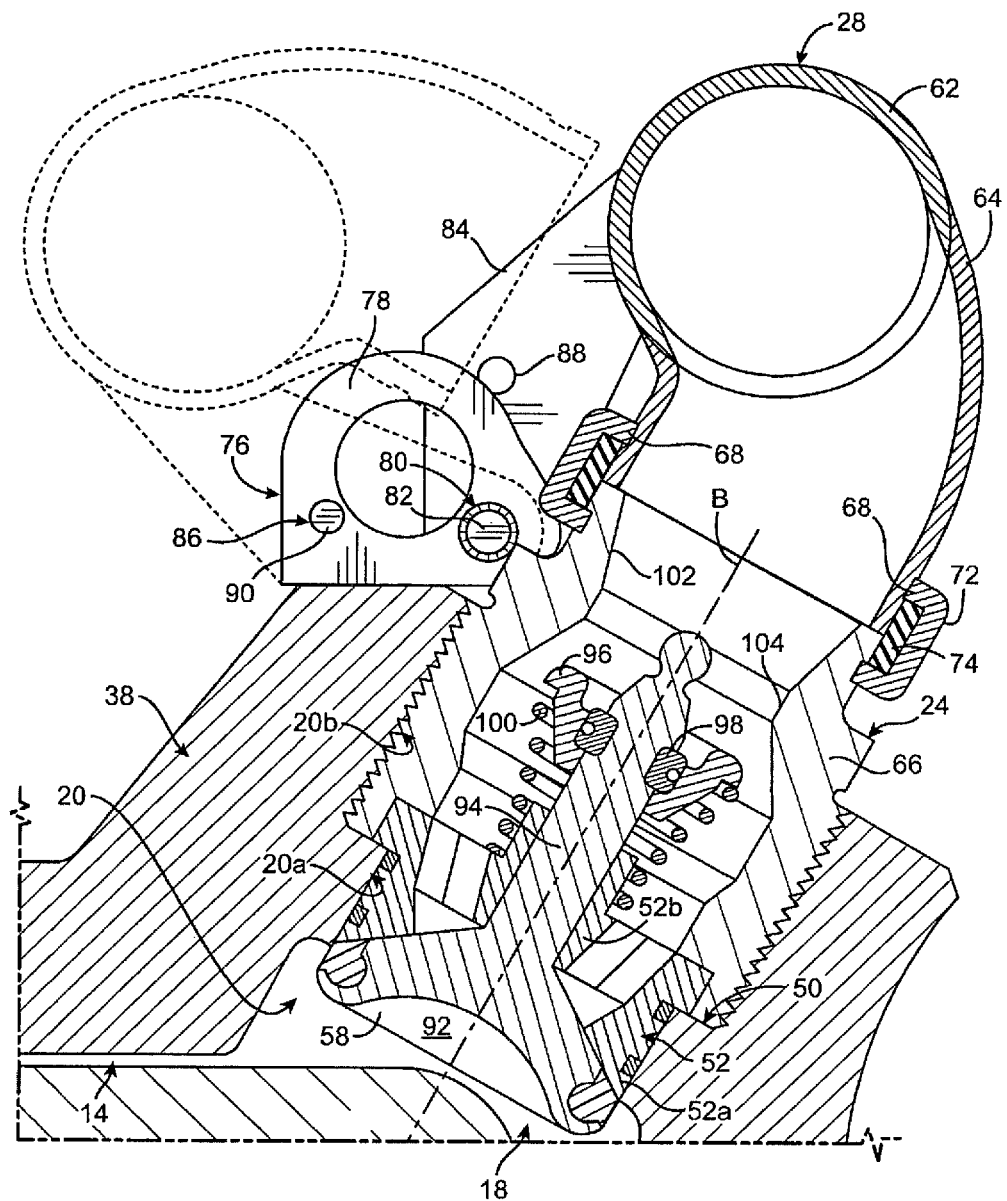
FIG. 2C is a cross-sectional view of an upper, right portion of the first embodiment of the fluid end assembly according to the preferred embodiment of the present application.
Figure 2D:
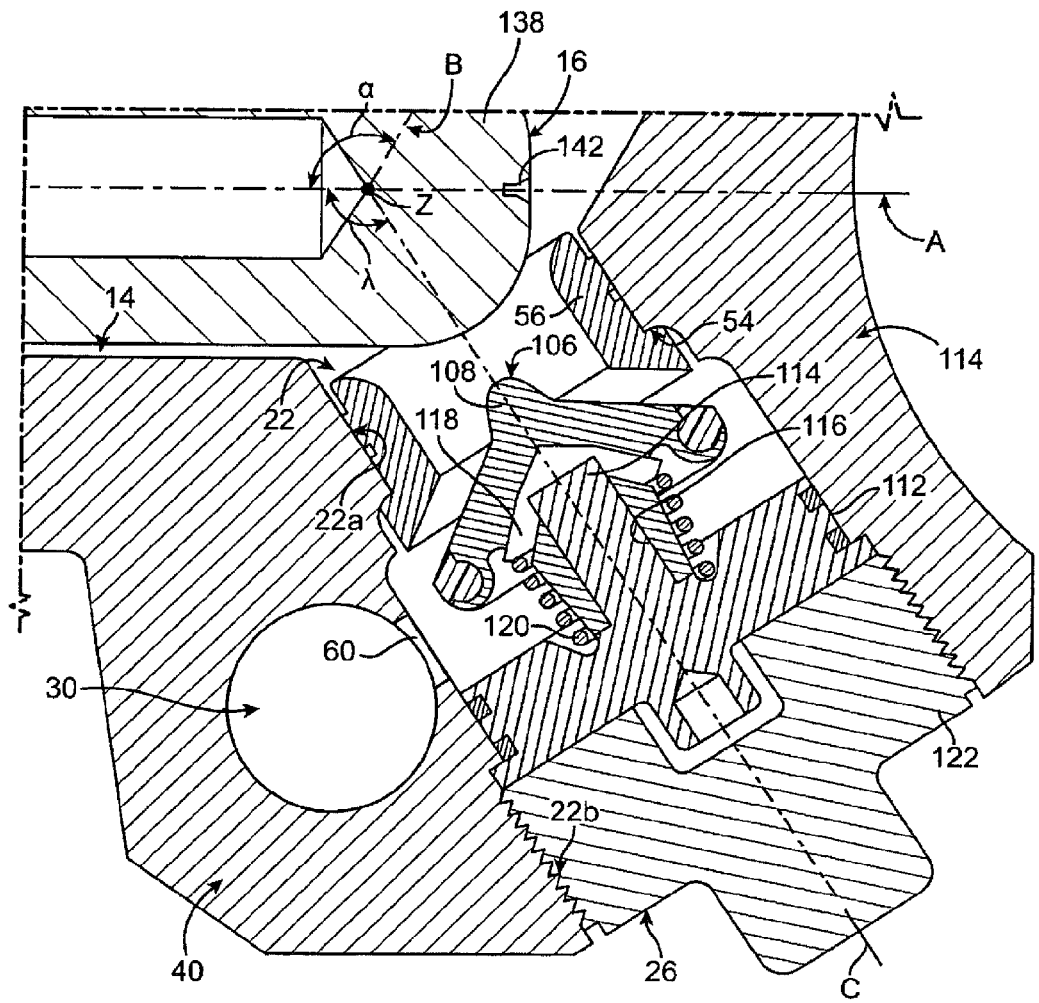
FIG. 2D is a cross-sectional view of a lower right portion of the first embodiment of the fluid end assembly according to the preferred embodiment of the present application.

Reference point Z is placed on centerline A at a location that facilitates the movement of fluid from suction passage 20 into pumping chamber 18 and from pumping chamber 18 into discharge passage 22 as plunger 16 reciprocates from its innermost point of travel to the right of point Z in FIG. 2D to its outermost point of travel to the left of point Z in FIG. 2D. (At its innermost point of travel, illustrated in FIG. 2D, plunger 16 has passed point Z to move into both suction passage 20 and discharge passage 22. Suction valve piston 58 is provided with a concave cross section to avoid contact with plunger 16 and so is discharge valve seat 56.) Obtuse angle α, measuring about 120°, is somewhat less than obtuse angle λ, measuring about 125°, to accommodate outlet passage 30 in discharge section 40. The resulting Y-shaped configuration offered by the intersections of plunger bore 14, suction passage 20, discharge passage 22 and their associated centerlines A, B and C reduces stresses within pump housing 12 during the use of fluid end assembly 10 to minimize the likelihood of pump housing 12 cracking over time and maximize the service life of assembly 10.

Outlet passage 30 passes through discharge section 40, extending from one end of discharge section to the other. A connector passage 60 intersects outlet passage 30 at right angles to place discharge passage 22 in fluid communication with outlet passage 30. To either end, or both ends, of discharge section 40 is connected one or more conduits (not shown) for carrying pressurized fluid away from outlet passage 30 and fluid end assembly 10. This pressurized fluid is used in oilfield applications to fracture subterranean rock formations. Placing outlet passage 30 away from discharge valve 26 limits the transverse or lateral flow of fluid through the discharge valve 26, especially in fluid end assemblies constructed with multiple, parallel sets of plungers 16 and valves 24 and 26. Discharge valve 26, therefore, runs without interference from turbulent flow through outlet passage 30 thereby resulting in a smoother-running and more efficient fluid end assembly 10.

Supply manifold 28 includes a tubular body 62 whose opposite ends are connected to a fluid source when assembly 10 is operated. A tubular connector 64 extends downwardly from tubular body 62 to engage the open top of valve retainer 66 of suction valve 24. The bottom of connector 64 is provided with a peripheral slot 68 and the top of valve retainer 66 is provided with a similar, peripheral slot 70. Slots 68 and 70 accommodate a VICTAULIC coupling body 72 of well-known construction for the quick and easy connection of valve retainer 66 to manifold 28. Within body 72 is positioned a VICTAULIC rubber seal 74 to prevent fluid leaks from body 72.

To permit the easy servicing of suction valve 24 without the need to fully disengage manifold 28 from assembly 10, one or more hinges 76 join manifold 28 to pump housing 12. Each hinge 76 has a mounting bracket 78 secured by one or more threaded fasteners (not shown) to pump housing 12. Mounting bracket 78 has a transverse aperture 80 that accommodates a hinge pin 82. The inner end of a swing arm 84 is pivotally attached by hinge pin 82 to mounting bracket 78. The outer end of swing arm 84 is affixed to tubular body 62. When VICTAULIC coupling body 72 is removed from assembly 10, manifold 28 is free to pivot 90° on hinge 76 to the broken line position seen in FIG. 2B.

Supply manifold 28 can be locked in a pivoted position to permit suction valve 24 to be easily serviced. To this end, a second transverse aperture 86 is provided in mounting bracket 78 adjacent first transverse aperture 80 and a third transverse aperture 88, positioned for registration with second aperture 86 when manifold 28 is in a pivoted position, is provided in swing arm 84. Locking manifold 28 in the pivoted position is afforded by extending a locking pin 90 through registered apertures 86 and 88.

Mounting bracket 78 is provided in the form of a loop or ring to serve as a lifting eye for fluid end assembly 10. By grasping bracket 78 with suitable lifting hook or chain, assembly 10 can be elevated while mounted upon power end 34 or not. Thus, assembly 10 can be safely and easily transported from place to place.

Suction valve 24 includes valve seat and guide assembly 52 tightly fitted into the bottom part 20a of suction passage 20. A piston 58 moves within assembly 52 to control the flow of fluid through suction passage 20. Piston 58 has a head 92 for engaging the seat portion 52a of assembly 52 and a stem 94 extending upwardly from head 92 through the guide portion 52b of assembly 52. A valve keeper 96 is fitted upon the top of stem 94 and is retained there by a split ring 98. A compressed spring 100 is positioned between guide portion 52b and keeper 96 for normally retaining head 92 in engagement with seat portion 52a so as to prevent fluid flow through passage 20. Externally, helically threaded, valve retainer 66 is screwed into top part 20b of suction passage 20 to retain the balance of valve 24 within pump housing 12 and provide for the attachment of valve 24 to manifold 28. Valve retainer 66 has a tapered inner passageway 102 with a small-diameter, orifice portion 104 that serves to maintain a fluid velocity through fluid end assembly 10 that is sufficient to prevent proppant particles carried by a pumped fluid from dropping from suspension and blocking suction valve 24. Of course, the relatively large, outer diameter of valve retainer 66 permits valve seat and guide assembly 52, piston 58, spring 100, etc., to be accessed from the exterior of pump housing 12 (once manifold 28 is pivoted out of the way and retainer 66 is disengaged from housing 12) making the servicing of suction valve 24 simpler.

Pump housing 12 is substantially strengthened by helically threading the entirety of the top part 20b of suction passage 20. The coextensive threads on the exterior of valve retainer 66 distribute pressure loads evenly to the pump housing 12 thereby inhibiting the formation of cracks in the pump housing 12 at the bottom of top part 20b adjacent seat deck 50 caused by cyclical loading of fluid end assembly 10.

Discharge valve 26 includes valve seat 56 positioned in top part 22a of discharge passage 22 and a reciprocating piston 106 for controlling the flow of fluid through passage 22. Piston 106 has a head portion 108 for engaging valve seat 56 and a hollow, stem portion 110 extending downwardly from head portion 108. A valve guide 112 is positioned below piston 106 in passage 22 and has a guide rod 114 that projects upwardly into a longitudinal socket 116 provided in stem portion 110 where it is slidably received. A number of radial apertures 118 penetrate the bottom of stem portion 110 to equalize the pressures in passage 22 and socket 116. A compressed spring 120 is disposed between the valve guide 112 and head portion 108 to normally press head portion 108 into engagement with seat 56. A valve retainer 122 is screwed into the bottom part 22b of passage 22 to retain valve 26 within pump housing 12.

Plunger assembly 124 includes a pony rod adapter 126, plunger 16 releasably attached to pony rod adapter 126, and a pony rod 128 being releasably attached to pony rod adapter 126. Pony rod adapter 126 has a first cylindrical body 130 and a number of apertures 132 penetrating first cylindrical body 130 for engagement by a first spanner wrench (not shown). A first helically threaded pin 134 is affixed to first cylindrical body 130 and projects from one of its ends. A second helically threaded pin 136 is affixed to first cylindrical body 130 and projects from the other of its ends.

Plunger 16 has a second cylindrical body 138 for reciprocating within a pumping chamber 18. Second cylindrical body 138 has a first outer end with a first helically threaded bore 140 for threadably receiving first helically threaded pin 134. Second cylindrical body 138 also has a first inner end with a socket 142 useful for supporting for body 138 at the time of its manufacture. A number of radial holes 174 are provided around the outer end of plunger 16 for engagement by a second spanner wrench (not shown). In use, with the first spanner wrench engaged with pony rod adapter 126, the second spanner wrench grasps plunger 16 and applies the torque needed to unscrew plunger 16 from pony rod adapter 126.

Pony rod 128 has a third cylindrical body 144 for reciprocating into, and out of, power end 34. Third cylindrical body 144 has a second inner end with a second helically threaded bore 146 for threadably receiving second helically threaded pin 136. Third cylindrical body 144 also has a second outer end. A peripheral flange 148 is affixed to, and extends outwardly from, the second outer end. Peripheral flange 148 is provided with a number of holes 150 through which an equal number of threaded fasteners (not shown) are extended for connecting pony rod 128 to the reciprocating components of the power end 34.

Fluid end assembly 10 pressurizes fluid by means of the reciprocating action of plunger 16. Valves 24 and 26 permit fluid pressurized by plunger 16 to move only in one direction from manifold 28 to outlet passage 30. The Y-shaped configuration of bore 14 and passages 20 and 22 in addition to the thick, tapered walls provided to plunger section 32, suction section 38, and discharge section 40 provide pump housing 12 with a construction that is robust and not prone to fail under the cyclical loading developed by plunger 16. Should plunger 16, valves 24 and 26, packing unit 44, gland nut 46, or plunger assembly 124 ever require servicing, they are easy to repair or replace with ordinary tools and without major disassembly of the fluid end assembly 10.

Figure 3:
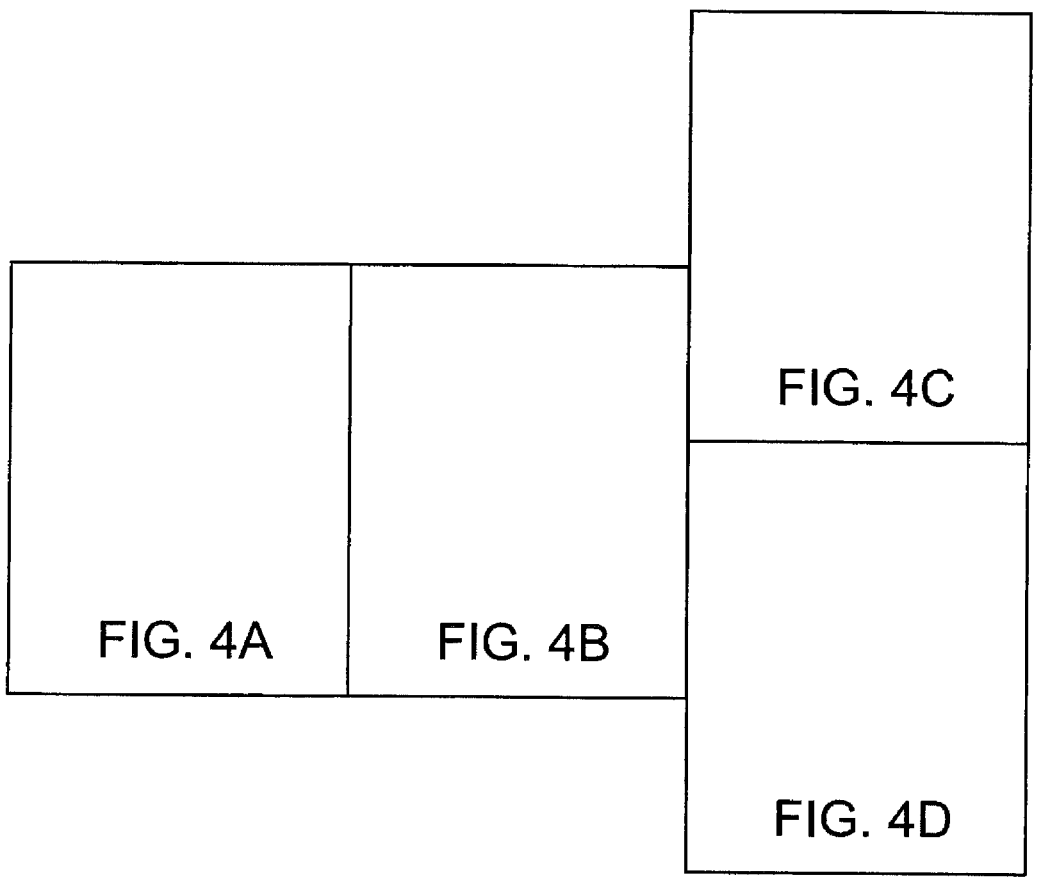
FIG. 3 is a schematic view showing the relative positions of the four drawing sheets carrying FIGS. 4A, 4B, 4C, and 4D.

Referring now to FIGS. 3 and 4 of the drawings, a second embodiment of my fluid end assembly is shown at 410. Fluid end assembly 410 is substantially the same as fluid end assembly except that a suction valve 424 and a discharge valve 426, and the passages 420 and 422 for the valves 424 and 426, have been modified somewhat. These modifications are believed to further strengthen valves 424 and 424 and fluid end assembly 410.

Fluid end assembly 410 includes a pump housing 412 having a plunger bore 414 within which a plunger 416 reciprocates. At its inner end, plunger bore 414 terminates in a pumping chamber 418 that is supplied with fluid by a suction passage 420 in pump housing 412. Fluid pressurized by plunger 416 exits pumping chamber 418 through a discharge passage 422 in pump housing 412 located opposite suction passage 420. A suction valve 424 in suction passage 420 permits the one-way flow of fluid from a supply manifold 428 to pumping chamber 418. A discharge valve 426 in discharge passage 422 allows that one-way flow of fluid from chamber 418 into an outlet passage 430 for release from assembly 410.

Pump housing 412 is a steel forging. Housing 412 has a plunger section 432 that contains the outer end of plunger bore 414 and is adapted for attachment to the power end of a high-pressure pump 434 by a number of stay rods 436. A suction section 438, containing suction passage 420, is integrally formed with plunger section 432 and extends forwardly and upwardly from plunger section 432. Similarly, a discharge section 440, containing discharge passage 422, is integrally formed with plunger section 432 and suction section 438 and extends forwardly and downwardly from plunger section 432. Suction and discharge sections 438 and 440 taper from their inner ends to their outer ends.

Plunger bore 414 is provided within pump housing 412 along a first centerline A'. At its outer end, plunger bore 414 is widened and partly threaded at 442 to receive a packing unit 444 and a rotatable gland nut 446 that, together, provide a fluid-tight seal around plunger 416. A lubricating port 448 in plunger section 432 permits a liquid lubricant to flow to plunger 416 at a point between packing unit 444 and gland nut 446.

Suction passage 420 intersects plunger bore 414 and has a second centerline B' that is coplanar with centerline A' and intersects centerline A' at a reference point Z' to define a first obtuse angle $\alpha'$. Passage 420 extends from the bottom to the top of suction section 438. Passage 420 has a tapered, bottom part 420a, increasing in diameter from bottom to top with sides sloping about 15° relative to centerline A'. Passage 420 also has a helically threaded, top part 420b of relatively large diameter.

Passage 420 has a deck 450 that serves as a guide for installing seat 452 of suction valve 424. The top of part 420a, being of smaller diameter than the bottom of part 420b, forms deck 450 in housing 412. The innermost portion of deck 450, located closest to centerline B', is oriented at right angles to centerline B'. Since no portion of valve 424, described hereinbelow, rests upon deck 450 there is little likelihood of fatigue-induced cracks forming in or around deck 450.

Discharge passage 422 intersects both plunger bore 414 and suction passage 420 and has a third centerline C'. Centerline C' is coplanar with centerlines A' and B' that it intersects at reference point Z' so as to define a second obtuse angle $\lambda'$. Additionally, passage 422 has a tapered, top part 422a, increasing in diameter from top to bottom with sides sloping about 15° relative to centerline C'. Passage 422 also has a medial part 422b of somewhat greater diameter than the bottom of part 422a. Finally, passage 422 has a helically threaded, bottom part 422c having a diameter greater than that of part 422b.

Passage 422 has a deck 454 that serves as a guide for installing seat 456 of discharge valve 426. The bottom of part 422a, being of smaller diameter than the top of part 422b, forms deck 454 in housing 412. The innermost portion of deck 450, located closest to centerline C', is oriented at right angles to centerline C'. Since no portion of valve 426, described hereinbelow, rests upon deck 454 there is little likelihood of fatigue-induced cracks forming in or around deck 454.

Figure 4A:
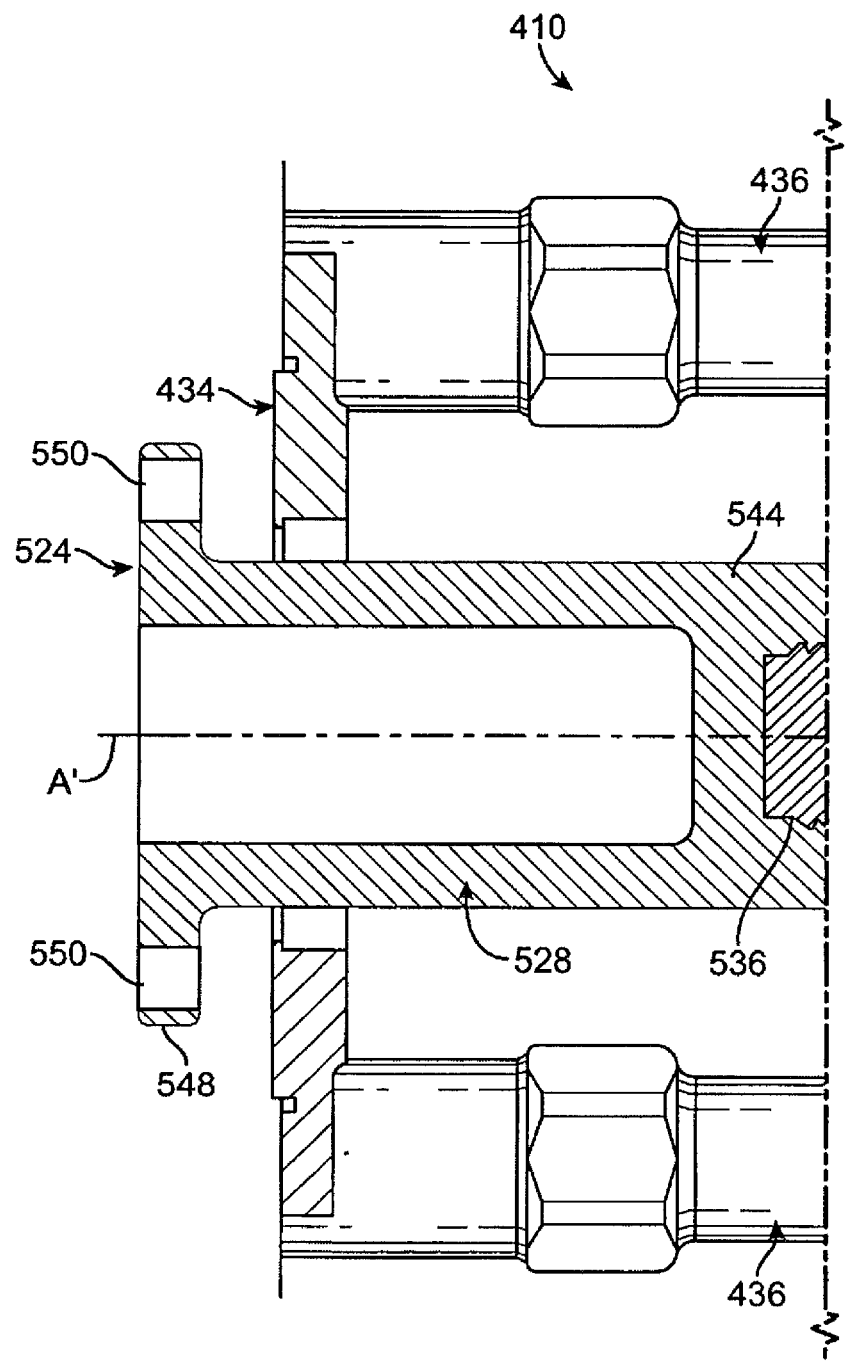
FIG. 4A is a cross-sectional view of the left portion of a second embodiment of my fluid end assembly.
Figure 4B:
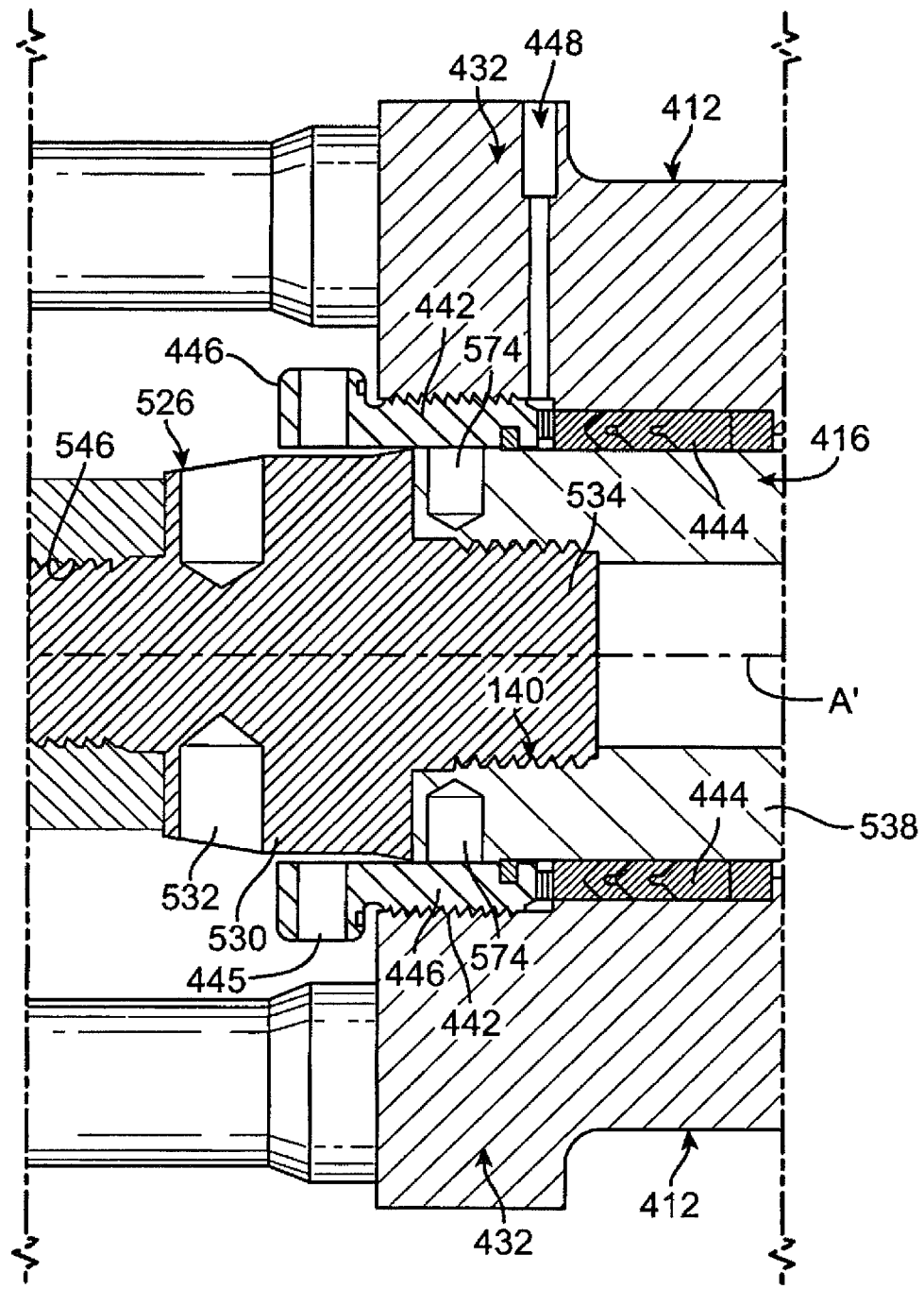
FIG. 4B is a cross-sectional view of the central portion of the second embodiment of my fluid end assembly.
Figure 4C:
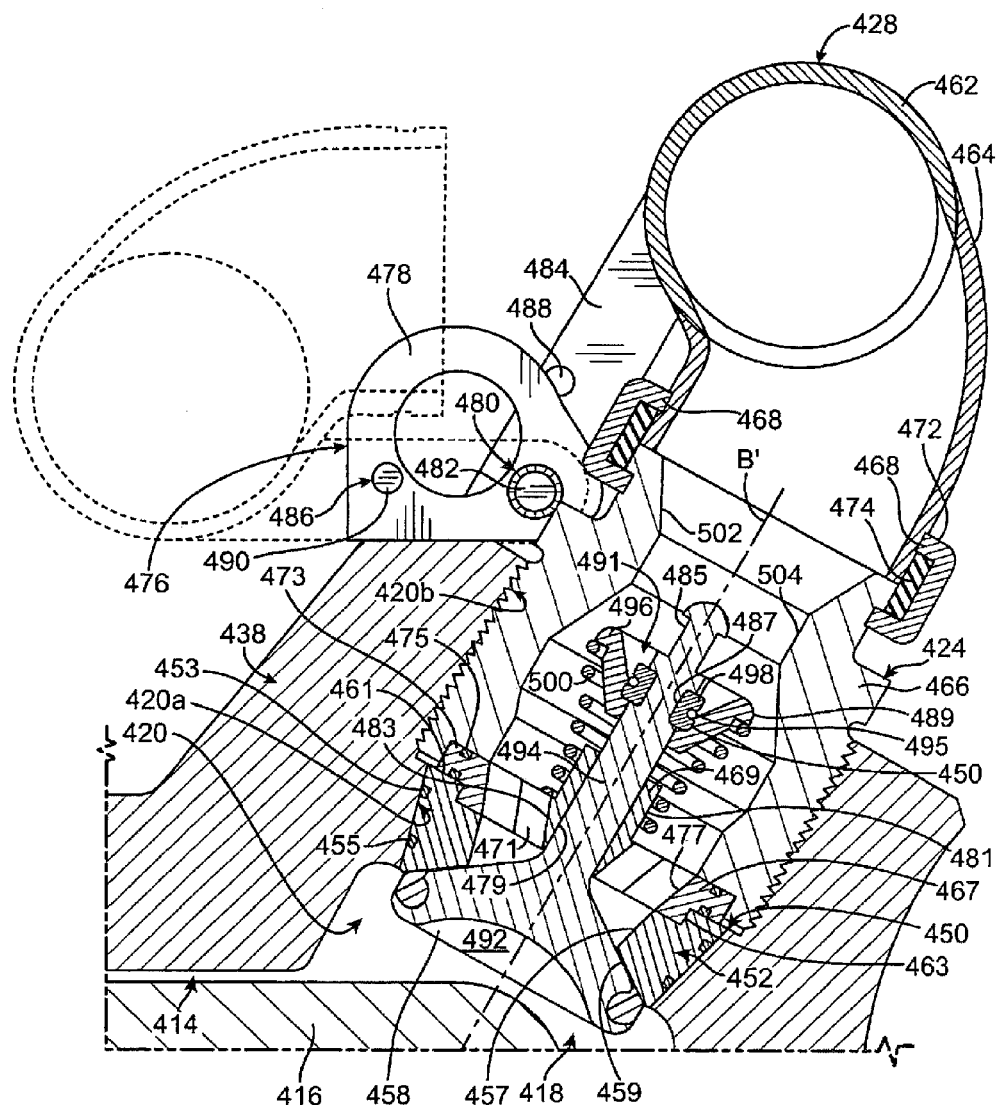
FIG. 4C is a cross-sectional view of the upper, right portion of the second embodiment of my fluid end assembly.
Figure 4D:
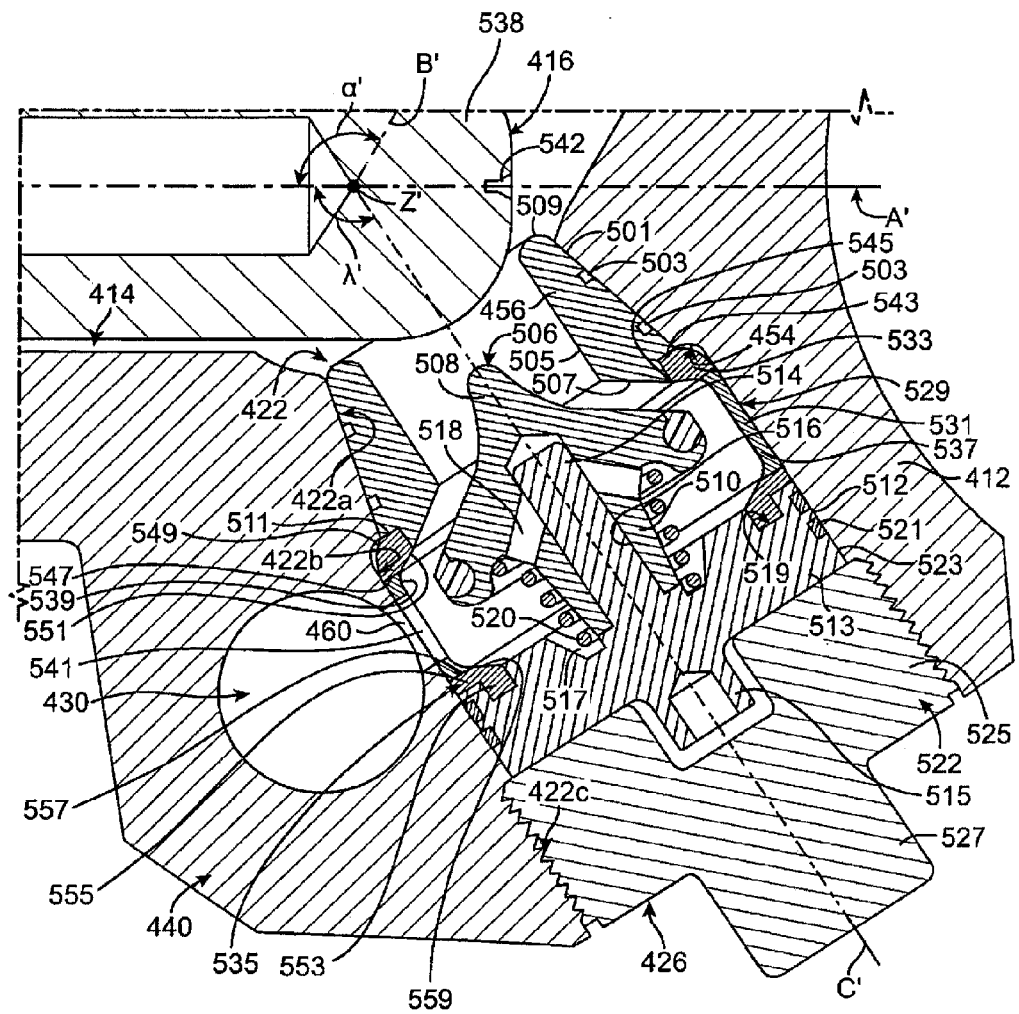
FIG. 4D is a cross-sectional view of the lower right portion of the second embodiment of my fluid end assembly.

Reference point Z' is placed on centerline A' at a location that facilitates the movement of fluid from pumping chamber 418 into discharge passage 422 as plunger 416 reciprocates from its innermost point of travel to the right of point Z' in FIGS. 4B and 4C to its outermost point of travel to the left of point Z' in FIGS. 4B and 4C. (At its innermost point of travel, illustrated in FIGS. 4B and 4C, plunger 416 passes point Z' to pass into both suction passage 420 and discharge passage 422 and penetrates suction valve 424 and discharge valve 426. Suction valve piston 458 is provided with a concave cross section to avoid contact with plunger 416 and discharge valve seat 456 is similarly open.) Obtuse angle $\alpha'$, measuring about 120°, is somewhat less than obtuse angle $\lambda'$, measuring about 125°, to accommodate outlet passage 430. The resulting Y-shaped configuration offered by the intersections of plunger bore 414, suction passage 420, discharge passage 422 and their associated centerlines A', B' and C' reduces stresses within pump housing 412 during use.

Outlet passage 430 extends through discharge section 440. A connector passage 460 intersects outlet passage 430 at right angles to place discharge passage 422 in fluid communication with outlet passage 430. To either end of discharge section 440 can be connected one or more conduits (not shown) to carry pressurized fluid away from outlet passage 430 and assembly 410. Placing outlet passage 430 away from discharge valve 426 in an unconventional manner keeps the flow of fluid over and around the discharge valve 426 to a minimum, limiting vibrations.

Supply manifold 428 includes a tubular body 462 whose opposite ends are connected to a fluid source when assembly 410 is in operation. A tubular connector 464 extends downwardly from tubular body 462 to engage the open top of valve retainer 466 of suction valve 424. The bottom of connector 464 is provided with a peripheral slot 468 and the top of valve retainer 466 is provided with a similar, peripheral slot 470. Slots 468 and 470 accommodate a VICTAULIC coupling body 472 for the connection of valve retainer 466 to manifold 428. Within body 472 is positioned a VICTAULIC rubber seal 474.

To permit the easy servicing of suction valve 424 without the need to fully disengage manifold 428 from assembly 410, one or more hinges 476 join manifold 428 to pump housing 412. Each hinge 476 has a mounting bracket 478 secured by one or more threaded fasteners (not shown) to pump housing 412. Mounting bracket 478 has a transverse aperture 480 that accommodates a hinge pin 482. The inner end of a swing arm 484 is pivotally attached by hinge pin 482 to mounting bracket 478. The outer end of swing arm 484 is affixed to tubular body 462. When VICTAULIC coupling body 472 is removed from assembly 410, manifold 428 can pivot 90° on hinge 476 to the broken line position seen in FIG. 4C.

Supply manifold 428 can be secured in a pivoted position to permit suction valve 424 to be easily serviced. To this end, a second transverse aperture 486 is provided in mounting bracket 478 adjacent first transverse aperture 480 and a third transverse aperture 488, positioned for registration with second aperture 486 when manifold 428 is in a pivoted position, is provided in swing arm 484. Locking manifold 428 in the pivoted position is afforded by extending a locking pin 490 through registered apertures 486 and 488.

Mounting bracket 478 is provided in the form of a loop or ring to serve as a lifting eye for fluid end assembly 410. By grasping bracket 478 with suitable lifting apparatus, assembly 410 can be elevated while mounted upon power end 434 or not. Thus, assembly 410 can be safely and easily transported.

Suction valve 424 includes a funnel-shaped, valve seat 452 positioned in the bottom part 420a of suction passage 420. As shown, seat 452 has an outside surface 453 that slopes downwardly and inwardly at an angle of about 15° relative to axis B' and fits flush against bottom part 420a. A pair of O-ring seals 455 is inset into outside surface 453 to prevent fluid from leaking around seat 452. Seat 452 also has an inside surface 457 that is substantially parallel to outside surface 453 that channels flowing fluid toward an opening of predetermined size in the bottom of seat 452 that serves as an orifice to regulate the rate of flow of fluids through suction valve 424. The bottom surface 459 of seat 452 slopes upwardly and inwardly toward axis B' at an angle of about 45° and the top surface 461 of seat 452 is oriented at right angles to axis B'. Around the inside of top surface 461, seat 452 is provided with a peripheral channel 463.

A valve guide 465 is positioned atop valve seat 452. Valve guide 465 includes an outer ring 467 and an inner ring 469 connected together by a number of radial fins 471. Outer ring 467 fits snugly within peripheral channel 463 and extends upwardly therefrom. Ring 467 has a circumferential flange 473 that projects outwardly from the top thereof to engage top surface 461. A pair of O-ring seals 475 is inset into the top and bottom of flange 473 to prevent fluid leaks around ring. Ring 467 has a inside surface 477 that slopes downwardly and inwardly at a somewhat shallower angle than inside surface 457 to direct fluid toward valve seat 452.

Inner ring 469 is centrally positioned within outer ring 467. Ring 469 has an interior surface 479 for slidably engaging the stem 494 of a piston 458 and an exterior surface 481. Extending outwardly from the bottom of exterior surface 481 is a radial flange 483 that serves as an abutment for the top of a compressed spring 500.

Inner ring 469 and outer ring 467 are connected together by a number of fins 471 integrally formed therewith. Fins 471 radiate outwardly from flange 483 at 120° intervals and connect to inside surface 481. Fins 471 are relatively thin and present a minimal impediment to the flow of fluids through valve 424.

Piston 458 moves against valve seat 452 to control the flow of fluid through suction passage 420. Piston 458 has a head 492 for engaging seat 452 and a stem 494 extending upwardly from head 492 and through inner ring 469. A peripheral groove 485 is provided around the free end of stem 494 for grasping piston 458 from the exterior of fluid end assembly 410 during installation of valve 424. Another peripheral groove 487 is provided in stem 494 a short distance below groove 485.

A valve keeper 496 is fitted over the top of stem 494 and has a conical configuration. Keeper 496 is conical and has an exterior diameter that decreases from its top to its bottom. Extending outwardly from the top of keeper 496 is a peripheral rim 489 that serves as an abutment for the top of spring 500.

A recess 491 is provided in the top of keeper 496 for snugly receiving split ring 498 that is fitted into groove 487 in stem 494. To ensure that split ring 498 does not slide from recess 491, split ring 498 is outfitted with an inset O-ring 495. O-ring 495 serves as a safety feature to wedge keeper 496 and split ring 498 together even if spring 500 breaks thereby reducing the likelihood that piston 458 will come loose during the use of valve 424 and engage plunger 416.

Compressed spring 500 is positioned between flange 483 and rim 489 for normally retaining head 492 in engagement with seat 452 to prevent fluid flow through passage 420. Spring 500 is, however, resilient enough to permit the piston 458 to move away from seat 452 and permit the entry of fluid into pumping chamber 418 when plunger 416 creates a partial vacuum in pumping chamber 418.

Externally helically threaded, valve retainer 466 is screwed into top part 420b of suction passage 420 to retain the balance of valve 424 within pump housing 412 and provide for the attachment of valve 424 to manifold 428. Valve retainer 466 has a tapered inner passageway 502 with a small-diameter, orifice portion 504 that serves to maintain a fluid velocity through fluid end assembly 510 that is sufficient to prevent proppant from dropping from suspension and preventing the normal operation of suction valve 424. Of course, the relatively large, outer diameter of valve retainer 466 permits valve seat and guide assembly 452, piston 458, spring 500, etc., to be accessed from the exterior of pump housing 412 (once manifold 428 is pivoted out of the way and retainer 466 is disengaged from housing 412) making servicing of suction valve 424 a breeze.

Pump housing 412 is substantially strengthened by helically threading the entirety of the top part 420b of suction passage 420. The coextensive threads on the exterior of valve retainer 466 distribute pressure loads evenly to the pump housing 412 inhibiting the formation of cracks in the pump housing 412 at the bottom of top part 420b adjacent seat deck 450.

Discharge valve 426 includes a funnel-shaped, valve seat 456 positioned in the top part 422a of discharge passage 422. Seat 456 has an outside surface 501 that slopes downwardly and outwardly at an angle of about 15° relative to axis C' and fits flush against top part 422a. A pair of O-ring seals 503 is inset into outside surface 501 to prevent fluid from leaking around seat 456. Seat 456 also has an inside surface 505 that is substantially parallel to axis C' that channels flowing fluid toward outlet passage 430. The bottom surface 507 of seat 456 slopes upwardly and inwardly toward axis C' at an angle of about 45°, and the top surface 509 of seat 456 is rounded to receive pressurized fluid from pumping chamber 418. Around the outside of bottom surface 507, seat 456 is provided with a peripheral channel 511. Peripheral channel 511 has a depth sufficient to bring the bottom of outside surface 501 flush with seat deck 454.

Valve 426 has a reciprocating piston 506 controlling the flow of fluid through passage 422. Piston 506 has a head portion 508 for engaging bottom surface 507 and a hollow, stem portion 510 extending downwardly from head portion 508. A number of radial apertures 518 penetrate the bottom of stem portion 510.

A valve guide 512 is positioned below piston 506 in passage 422. Valve guide 512 has a disk-like base plate 513 that fits snugly into the middle portion 422b of discharge passage 422. A guide rod 514 is affixed to, and projects upwardly from, the top of base plate 513 into a longitudinal socket 516 provided in stem portion 510 where rod 514 is slidably received. An internally threaded socket 515 is affixed to, and projects downwardly from, the bottom of base plate 513. Socket 515 is provided for grasping valve guide 512 to remove it from pump housing 412 during the servicing of valve 426.

The top of base plate 513 is provided with a recess 517 that extends around the bottom of guide rod 514. Recess 517 extends about half way into base plate 513 and receives the bottom of a compressed spring 520. Recess 517 has a sloping side wall to prevent the bunching of spring 520 when such is compressed by the movement of piston 506.

A peripheral channel 519 is provided in the top of base plate 513. Channel 519 is spaced outwardly from recess 517 and has about one-half the depth thereof. The width of channel 519 is about the same as its depth.

A pair of O-ring seals 521 is inset into the outside surface 523 of base plate 513. O-ring seals 521 are closely spaced and are intended to prevent leaks from discharge passage 422 past valve guide 512.

A valve retainer 522 keeps valve 426 within pump housing 412. Retainer 522 has an externally helically threaded plug 525 that is screwed into the bottom part 422c of passage 422. A tightening stem 527 of hexagonal cross section is affixed to, and projects downwardly from, the bottom of plug 525. A wrench (not shown) grasps stem 527 so as to rotate retainer 522.

A compressed spring 520 is disposed between the valve guide 512 and head portion 508 to normally press head portion 508 into engagement with seat 456. Spring 520 loosely encircles stem portion 510. Spring is seated, at its top end against the bottom of head 508 and at its bottom end, in recess 517.

Discharge valve 426 has a liner assembly 529, disposed between valve seat 456 and valve guide 512, for minimizing the erosion of the pump housing 412 by pressurized, abrasive, proppant-bearing fluids. Liner assembly 529 has three parts: a liner 531, a liner holder 533 that engages valve seat 456, and a liner retainer 535 that engages valve guide 512. Together, the parts of liner assembly 529 closely cover the center part 422b of discharge passage 422. Furthermore, liner 531, liner holder 533 and liner retainer 535 have a combined height and stiffness that is sufficient to permit a firm, compressive force, generated by fully screwing retainer 522 into part 422c, to be imparted to valve seat 456. Thus, valve seat 456 cannot wobble in part 422a since it is wedged in place.

Liner 531 is a ring having an outer surface 537 of constant diameter being slightly less than the diameter of part 422b and an inner surface 539 that arcs inwardly at its top and bottom so as to thicken and strengthen liner 531 in these areas. An aperture 541 is provided in liner 531 for registration with connector passage 460. Aperture 541 has the same diameter as connector passage 460 so as to not impede flow into outlet passage 430.

Liner holder 533 is sized for snug positioning in peripheral channel 511. Liner holder 533 has a top surface 543 and an inside surface 545 that bear against valve seat 456. Liner holder 533 also has a bottom surface 547 that bears against liner 531. A convex, outside surface 549, having a radius of curvature that is less than that of seat deck 454 so as to not contact seat deck 454, connects top surface 543 to bottom surface 547. (By avoiding contact with seat deck 454, no additional stress is imparted to seat deck 454 by the addition of liner assembly 529 to fluid end assembly 410.) A medial surface 551 connects inside surface to bottom surface 547 and provides a smooth flow transition between bottom surface 507 and inner surface 539 of liner 531.

Liner retainer 535 has a ring portion 553 that is sized for snug positioning in peripheral channel 519. A peripheral flange portion 555 is affixed to, and projects outwardly from, the top of ring portion 553. Flange portion 555 has a top surface 557 that engages the bottom of liner 531. Ring portion 553 has a top surface 559 that slopes downwardly and inwardly from top surface 557 so as to provide a smooth flow transition between liner 531 and the top of base plate 513.

Plunger assembly 524 includes a pony rod adapter 526, plunger 516 releasably attached to pony rod adapter 526, and a pony rod 528 being releasably attached to pony rod adapter 526. Pony rod adapter 526 has a first cylindrical body 530 and a number of apertures 532 penetrating first cylindrical body 530. A first helically threaded pin 534 is affixed to first cylindrical body 530 and projects from one of its ends. A second helically threaded pin 536 is affixed to first cylindrical body 530 and projects from the other of its ends. Plunger 416 has a second cylindrical body 538 for reciprocating within a pumping chamber 418. Second cylindrical body 538 has a first outer end with a first helically threaded bore 540 for threadably receiving first helically threaded pin 534. Second cylindrical body 538 also has a first inner end with a polygonal socket 542 for receiving a plunger key (not shown). Pony rod 528 has a third cylindrical body 544 for reciprocating into, and out of, power end 434. Third cylindrical body 544 has a second inner end with a second helically threaded bore 546 for threadably receiving second helically threaded pin 536. Third cylindrical body 544 also has a second outer end. A peripheral flange 548 is affixed to, and extends outwardly from, the second outer end. Peripheral flange 548 is provided with a number of holes 550 through which an equal number of threaded fasteners (not shown) are extended for connecting pony rod 528 to the reciprocating components of the power end 434.

A number of radial holes 574 are provided around the outer end of plunger 416 for engagement by a spanner wrench. The wrench grasps plunger 416 at the holes 574 and applies torque and pulling force as needed to remove plunger 416 from pump housing 412.

Fluid end assembly 410 produces useful work by pressurizing fluid by means of the reciprocating action of plunger 416. Valves 424 and 426 permit fluid pressurized by plunger 416 to move only in one direction from manifold 428 to outlet passage 430. The Y-shaped configuration of bore 414 and passages 420 and 422 in addition to the thick, tapered walls provided to plunger, suction and discharge sections 432, 438 and 440 pump housing 412 with a construction that is durable and not prone to fail under repeated cyclic loading developed by plunger 416. Should plunger 416, valves 424 and 426, packing unit 444 and gland nut 446, or plunger assembly 524 ever require servicing, such are easy to repair or replace with ordinary tools and without major disassembly of fluid end assembly 410.

While fluid end assemblies 410 and 10 have been described with a high degree of particularity, it will be appreciated that modifications can be made to them. For example, while operating assemblies 410 and 10 with discharge valves 426 and 26 beneath suction valves 424 and 24 is a good idea, especially in freezing weather, since it permits the assemblies to be drained of fluid with a few strokes of plungers 416 and 16, some users may elect to operate assemblies 410 and 10 in an inverted fashion with discharge valves 426 and 26 being positioned above suction valves 424 and 24. Therefore, it is to be understood that this application is not limited to fluid end assemblies 410 and 10, but encompasses any, and all, fluid end assemblies within the scope of the claims. For example, fluid ends in which the suction valve and discharge valve share a common centerline, located one directly over the other.

Figure 7:
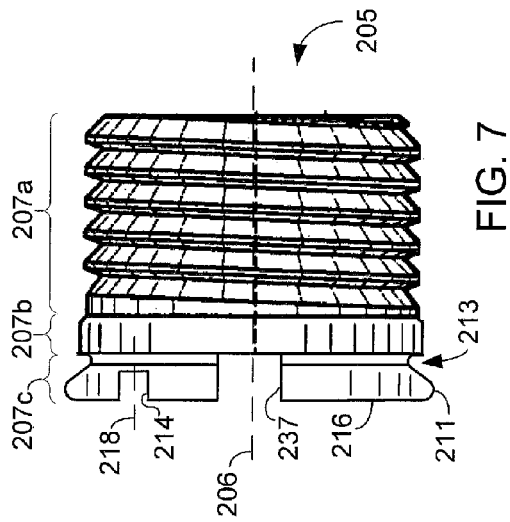
FIG. 7 is side view of a stud in the clamp assembly of FIG. 5.
Figure 5:
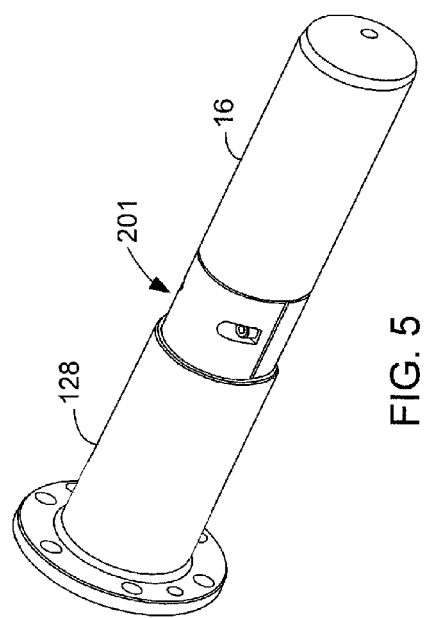
FIG. 5 is a perspective view of a clamp assembly used in the fluid end assembly of the present application.
Figure 6:
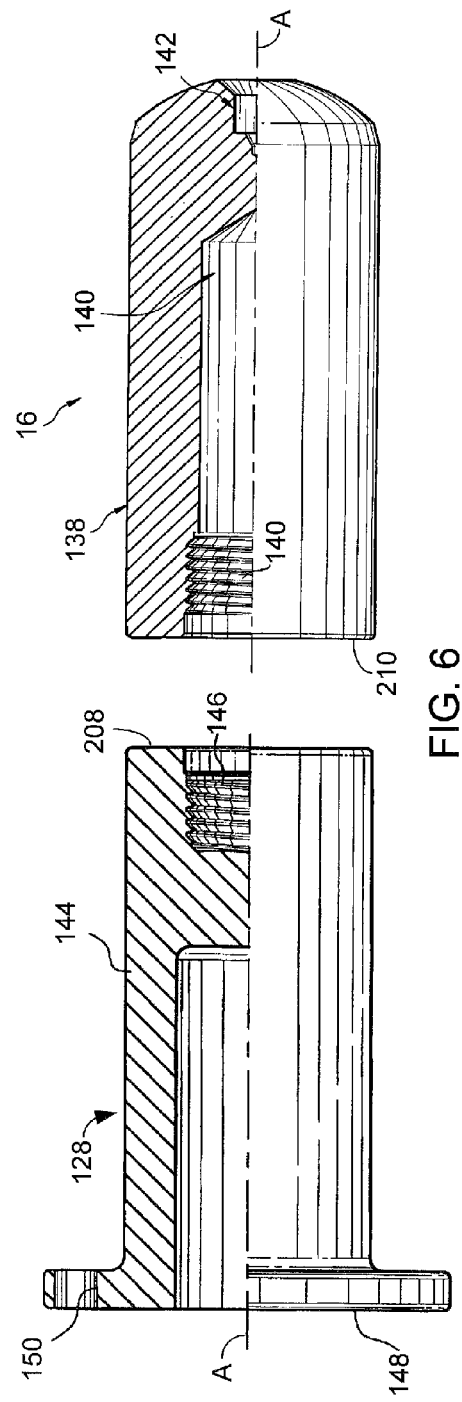
FIG. 6 is a partial section view of a plunger and pony rod used in with the fluid end of the present application.

Referring now also to FIGS. 5-7 in the drawings, a dovetail clamp assembly 201 is illustrated. Clamp assembly 201 is an alternative embodiment of pony rod adapter 126, 526. Clamp assembly 201 is able to operate with assemblies 410 and 10 and any other fluid end assembly as described previously. Clamp assembly 201 is configured to operate similarly to that of pony rod adapters 126, 526 in that clamp assembly 201 couples plunger 16 and pony rod 128 together, so as to permit power end 34 to drive plunger 16 within pump housing 12. Plunger 16 and pony rod 128, as well as the other portions of assemblies 10 and 410, maintain the same form and function as was described previously. Clamp assembly 201 includes a clamp 203, 215 having two symmetric half portions, and a clamp adapter stud 205. FIG. 5 illustrates a perspective view of one embodiment of clamp assembly 201 coupled to plunger 16 and pony rod 128. Clamp assembly 201 in FIG. 5 is illustrated without the use of a deflector 204, seen in FIG. 8. The purpose and function of deflector 204 within clamp assembly 201 will be described below.

Pump housing 12 is a steel block adapted for attachment to the power end of a high-pressure pump 34 by a number of stay rods 36. Stay rods 36 maintain the relative distance between pump 34 and housing 12. Conventional fluid ends have typically provided an aperture in the pump housing, opposite the power end, that permits plunger 16 to be removed from the assembly by passing through the fluid end, away from the power end. With fluid ends 10 and 410, the suction valves and discharge valves are aligned such that the aperture is not available. Therefore, removal of plunger 16 occurs in the present application by translating plunger 16 toward pump 34. The space between pump 34 and fluid end 10, 410 is fixed. It is understood that plungers 16 may be modified in length and diameter to accommodate removal from the fluid end.

Referring in particular to FIG. 6, a partial section view of plunger 16 and pony rod 128 is illustrated. Clamp assembly 201 is configured to operate with conventional plungers and pony rods of various fluid end assemblies. As noted previously, pony rod 128 includes a helically threaded bore 146 on the second inner end. Likewise, plunger 16 includes a helically threaded bore 140 on a first end. Pony rod adapter 126, 526 threadedly coupled to each part through corresponding helically threaded bores 140, 146.

Pony rod 128 has an abutment surface 208 relatively perpendicular to centerline A, located at the second inner end. Similarly, plunger 16 has an abutment surface 210 located in the first outer end, oriented relatively perpendicular to centerline A.

Referring in particular to FIG. 7, clamp assembly 201 further includes clamp adapter studs 205 configured to threadedly engage respective helically threaded bores 140, 146 in place of pins 134,136 of pony rod adapter 126. Stud 205 includes a threaded portion 207a, a seat portion 207b, and a flange portion 207c. Studs 205 are sized in diameter and threaded to engage bores 140, 146 of varied sizes. In so doing, clamp assembly 201 is configured to function as a retrofit to existing conventional fluid end systems. It is understood that all members of clamp assembly 201 may be sized differently to accommodate a range of fluid end assemblies and power ends.

Threaded portion 207a includes threads for engaging bore 140,146. Stud 205 has a central axis 206 that is coaxial with centerline A when in threaded engagement with bores 140, 146. Seat portion 207b is adjacent thread portion 207a. The outer surface of seat portion 207b is relatively smooth for mating with plunger 16 or pony rod 128. Seat portion 207b is recessed within plunger 16 or pony rod 128 when stud 205 is secured by interference fit via thread portion 207a. Flange portion 207c is adjacent seat portion 207b. Flange portion 207c includes a flange 211 and a groove 213. Groove 213 is formed by the contour of the flange surface as flange 211 extends externally away from seat potion 207b, away from central axis 206. Flange 211 extends radially around central axis 206 forming the relatively bulbous flange shape. When stud 205 is engaged in bores 140, 146, stud 205 is configured to extend away from abutment surfaces 208 and/or 210. In this embodiment, flange 211 extends over abutment surfaces 208 and/or 210 so as to form groove 213. Clamp 203 is configured to contact the groove surface between flange 211 and abutment surface 208 and/or 210 in a non-threaded relationship with studs 205. As discussed later, by engaging the groove surface, clamp 203 couples plunger 16 and pony rod 128 together without concern for debris-filled threads and the need to constantly tighten connections.

Although flange 211 has been described having a radially extending bulbous shape, it is understood that other shapes are possible. Furthermore, other embodiments may have one or more flanges or ribbed surfaces permitting engagement of clamp 203. The present application conceives of the use of one or more flanges 211 or ribs protruding from abutment surface 208/210 for clamp 203 to clamp around.

A setting aperture 214 is formed within flange portion 207c relatively perpendicular to a flange face 216. Aperture 214 is set within flange 211a set distance. Setting aperture 214 has an axis 218. Axis 218 is offset from and parallel with central axis 206. Setting aperture 214 is configured to permit stud 205 to be tightened and loosened within bores 140, 146. Although described as extending within flange portion 207c, it is understood that aperture 214 may extend any distance within stud 205.

Stud 205 also includes a stud bore 237. Stud bore 237 is an aperture formed within stud 205 similar to that of aperture 214. Bore 237 extends internally within stud 205 from flange face 216. Bore 237 is coaxially aligned with central axis 206. To threadedly engage stud 205 within bores 140, 146, a setting tool (not shown) is inserted into both a stud bore 237 and setting aperture 214 and rotated, so as to apply a torque in either a clockwise or counterclockwise direction about central axis 206. Rotation of stud 205 engages or releases threaded portion 207a from bores 140, 146.

Figure 8:
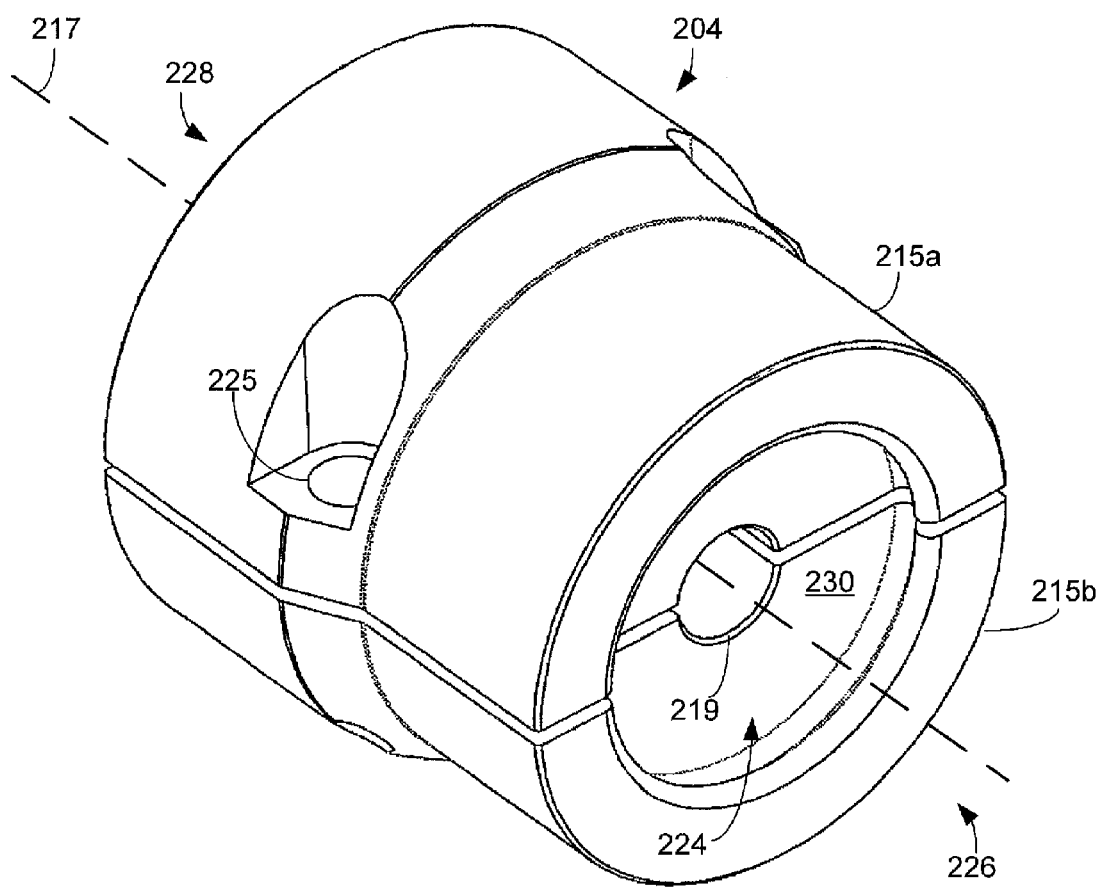
FIG. 8 is a perspective view of a clamp in the clamp assembly of FIG. 5, the clamp having an integral deflector.
Figure 9:
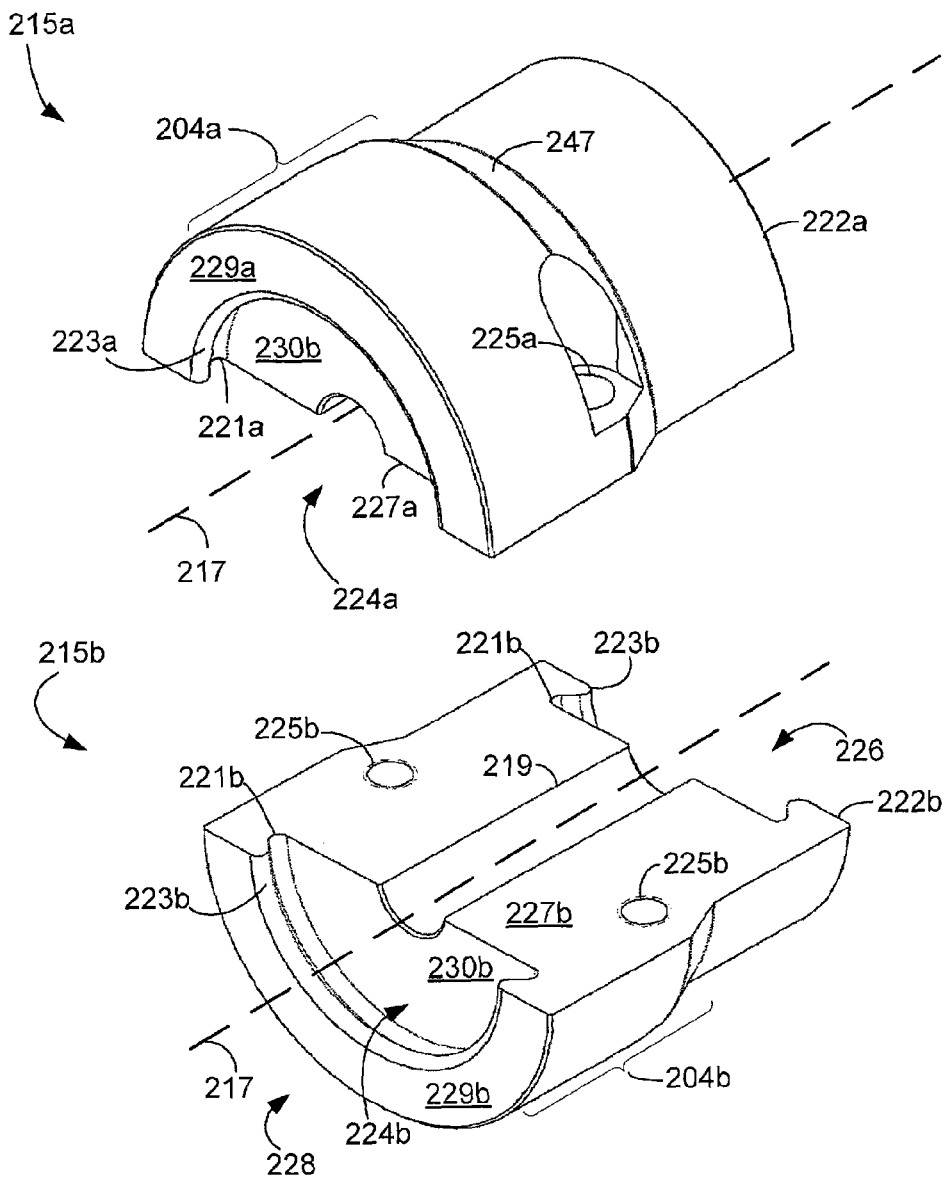
FIG. 9 is an exploded view of the clamp of FIG. 8.

Referring now also to FIGS. 8 and 9 in the drawings, a clamp 215 is illustrated. Clamp 215 is another embodiment of clamp 203. Clamp 203 and 215 operate in a similar form and function except that clamp 215 is illustrated as having deflector 204 integral within each portion. Description of the functions and form of clamp 215 will apply equally to that of clamp 203 except with regard to deflector 204.

Clamp 215 has a first portion 215a and a second portion 215b. A central axis 217 extends along the center of clamp 215 coaxial with a central bore 219. Central axis 217 is configured to coaxially align with centerline A when clamp 215 is secured around studs 205. Clamp 215 includes a plunger end 226 and a pony rod end 228. A cavity 224 is formed in each end 226, 228 of clamp 215. Cavity 224 is formed internally within clamp 215 and includes a cavity face 230. Cavity 224 is configured to accept flange portion 207c of studs 205. When assembled, clamp 215 surrounds flange portion 207c, thereby coupling plunger 16 and pony rod 128 together. Furthermore, when clamp 215 is assembled, clamp 215 operates to conceal internal components of clamp assembly 201, namely stud 205 and an alignment pin 231 (see FIG. 10). Clamp 215 is fastened together by use of one or more fasteners (not shown) through a fastener aperture 225.

It is understood that each portion 215a and 216b include some of the same features of clamp 215 as a whole. When describing features of clamp 215 with respect to each portion 215a and 215b, the respective reference letters "a" and "b" will be used to denote the features as seen on each portion 215a and 215b respectively.

Each portion 215a and 215b have a mating surface 227a, 227b that defines a plane running parallel with centerline A and/or axis 217. First portion 215a and second portion 215b contact one another along each mating surface 227a, 227b. Clamp 215 is symmetric about the plane defined by the mating surfaces. Being that first portion 215a and second portion 215b are symmetric about mating surface 227, discussion will be given concerning the features and functions of first portion 215a with the understanding that second portion 215b will have the same features and functions. It is also understood that the features and functions of clamp 215 apply equally to that of clamp 203.

Each portion 215a, 215b included half of cavity 224, lip 223 and recess 221 at both end 226, 228. Cavity 224a extends from mating surface 227a, radially outward from axis 217. Pony rod end 228 has an exterior face 229 and plunger end 226 has a exterior face 222. Exterior faces 229a, 229b wrap around and fold over both cavities 224a so as to form lip 223a at each end 226, 228. Cavity 224a is defined as the area bound by a cavity face 230a and a plane defined by the exterior faces. A recess 221a is formed within cavity 224a, being defined by the area between lip 223a and cavity face 230a.

In operation, plunger 16 and pony rod 128 are spaced apart a designated distance. The distance, as measured between flanges 211 of studs 205 within plunger 16 and pony rod 128, coincides with the distance between recesses 221 on opposing ends of each clamp portion 215a, 215b. Mating surface 227a, 227b of each clamp portion 215a, 215b are brought into contact. When in contact, flange 211 is engaged within recess 221 and groove 213 receives lip 223 for studs 205 associated with plunger 16 and pony rod 128 (non-threaded relationship). Fasteners are inserted into apertures 225 to couple clamp portions 215a and 215b together. Threaded fasteners are preferably used but other types of fasteners are possible. Although portion 215a was described above, the same form and features are associated with respect to portion 215b due to the symmetric nature of clamp 215.

While clamp 215 is installed about studs 205, exterior face 229, 222 is adjacent abutment surfaces 208, 210 respectively. Exterior faces 229, 222 are configured to permit a small gap of space between it and each abutment surfaces 208, 210. This avoids issues with binding and assists in permitting easier removal of clamp 215, 203.

Figure 10:
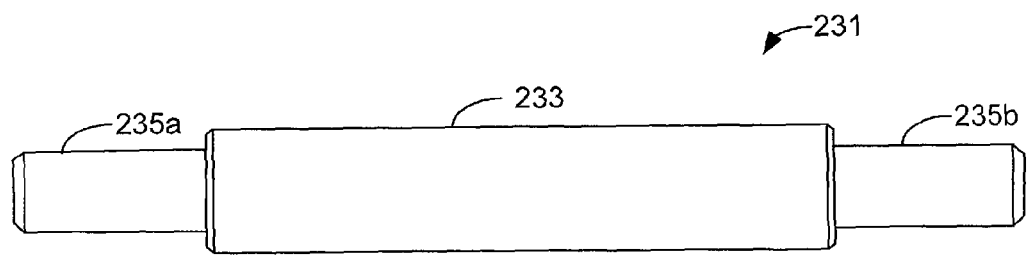
FIG. 10 is a side view of an alignment pin for use within the clamp assembly of FIG. 5.

Referring now also to FIG. 10 in the drawings, an alignment pin 231 is illustrated. During installation of clamp 215, 203, each clamp portion 215a, 215b is to be aligned with respect to centerline A. Clamp assembly 201 may include the use of alignment pin 231. Alignment pin 231 is configured to serve as an optional tool to assist in the alignment of each clamp portion 215a, 215b with respect to each stud 205. Alignment pin 231 has a center portion 233 of cylindrical shape and opposing end portions 235a and 235b integrally coupled to center portion 233. End portion 235a is inserted into stud bores 237 located respectively within stud 205 used with pony rod 128 and plunger 16. Central bore 219 is configured to contact the outer surface of center portion 233. Center portion 233 and each end portion is coaxially aligned with centerline A. It is understood that alignment pin 231 is optionally used with clamp assembly 201.

Figure 11:
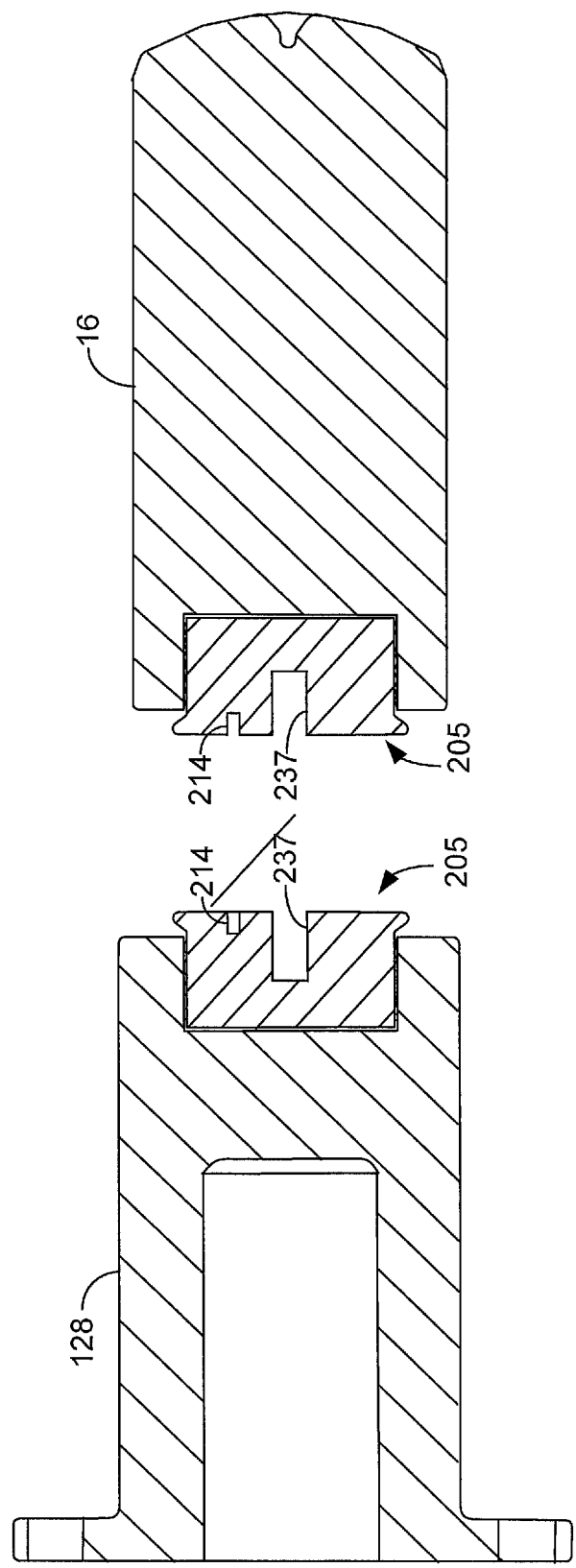
FIG. 11 is a section view of the stud of FIG. 7 in the pony rod and plunger of FIG. 6.

Referring now also to FIG. 11 in the drawings, a cross sectional view of studs 205 set within plunger 16 and pony rod 128. Studs 205 are included within clamp assembly 201 to allow for retrofit capabilities with plungers and pony rods having threaded bores 140, 146.

Referring now also to FIGS. 12 and 13 in the drawings, an alternative embodiment of clamp assembly 201 is illustrated. Clamp assembly 240 is an alternate embodiment of clamp assembly 201 and includes similar forms and functions to that of assembly 201 except as described herein. Clamp assembly 240 includes a plunger 241, a pony rod 243, and clamps 203, 215. Assembly 240 continues to include the use of clamps 203 or 215. However, in assembly 240, studs 205 are removed and a flange portion 245 is integrally formed into the abutment surfaces of plunger 16 and pony rod 128, thereby forming plunger 245 and pony rod 243. The form and functions of plunger 241 and pony rod 243 are similar to those described previously with respect to assembly 201.

Flange portions 245 extend from an abutment surface 246a of plunger 241 and abutment surface 246b of pony rod 243. Each flange portion 245 includes a respective flange and groove similar in form and function to that of stud 205. In such an embodiment, no setting aperture 214 is required due to the integral nature of flange portion 245. A stud bore 247 is located within plunger 241 and pony rod 243, having similar form and function to that of stud bore 237. Stud bore 247 is configured to optionally accept the use of alignment pin 231 when used.

Clamp assembly 201 is depicted in FIG. 5 without the use of a deflector 204. In FIG. 8, clamp portions 215a and 215b are shown as having integrally formed deflectors 204. Clamp assembly 201 optionally includes a deflector 204. Deflector 204 may be integrally formed with clamp assembly 201, as seen with clamp 215; or may be a separate member of clamp assembly 201, as seen with clamp 203. Deflector 204 is typically located adjacent the intersection of clamp 215, 203 and pony rod 128, 243. To aid in the removal of plunger 16, 241, the length of plunger 16, 241 is typically minimized as much as possible as a result of having to be removed between the fluid end and power end. In so doing, clamp assembly 201 and/or pony rod adapter 126, 526 are configured to translate within fluid end assembly 10 as pony rod 128 cycles between an extended and retracted position. To avoid contact between deflector 204 and pump housing 12, deflector 204 is located more toward pony rod 128, 243. Other locations may be used depending on whether deflector 204 is integral with clamp 215, 203 or a separate member.

Seals around rotatable gland nut 46 are susceptible to failure over time. When the seals fail, a pressurized stream of fluid can escape from pumping chamber 18 and cause damage to pump 34 or other members. Deflector 204 is configured to include an angled surface 247 to deflect any streams of escaped fluid. Deflector 204 thereby is used as a sacrificial part, adapted to receive the fluid stream as opposed to pump 34. Deflector 204 is easier to replace and has a drastically reduced price compared to pump 34. An additional feature of deflector 204 is that the pressurized stream of fluid is deflected away from centerline A at some angle thereby making the stream more easily detected to operators. Once detected, gland nut 46 can be repaired prior to any significant damage occurring.

The present application provides significant advantages, including: (1) reduced problems of thread-type adapter connections; (2) easy removal and installation of that clamp assembly; (3) removal of plunger without separating the fluid end from the power end; and (4) decreased maintenance time and complexity.

While the preferred embodiment has been described with reference to an illustrative embodiment, this description is not intended to be construed in a limiting sense. Various modifications and other embodiments of the application will be apparent to persons skilled in the art upon reference to the description.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A dove-tail clamp assembly for a fluid end, comprising:
    a plunger having:
        an first abutment surface; and
        an integral flange portion extending from the first abutment surface;
    a pony rod configured to induce a reciprocating movement of the plunger within the fluid end, the pony rod having a second abutment surface, the pony rod having a threaded bore extending within the second abutment surface;
    a removable stud threadedly engaged with the threaded bore of the pony rod, the stud having:
        a threaded portion configured to threadedly engage with the treaded opening;
        a seat portion;
        a flange portion; and
        a groove formed between the seat portion and the flange portion;
    a clamp configured to engage with the integral flange portion of the plunger and the groove of the stud in a non-threaded relationship, thereby releasably coupling the plunger to the pony rod, the clamp having:
        a deflector configured to extend outwardly from the centerline so as to extend beyond an outer surface of the plunger, the deflector having an angled surface, the deflector having a first cavity at a first end and a second cavity at a second end, the first end and the second end having different diameter sizes; and
    an alignment pin configured to align the plunger with the pony rod along the centerline.

2. The clamp assembly of claim 1, wherein the clamp has a first portion and a second portion releasably fastened together along a mating surface parallel to a centerline defined by an axis of the plunger.

3. The clamp assembly of claim 1, wherein the clamp translates within the fluid end with the plunger.

4. The clamp assembly of claim 1, wherein the angled surface is configured to prevent premature wear and damage by redirecting the flow of pressurized fluid escaping from a pumping chamber within the fluid end.

5. The clamp assembly of claim 1, wherein the deflector is integrally formed to the clamp adjacent to the pony rod end.

6. The clamp assembly of claim 1, wherein the deflector is releasably coupled to the clamp, such that the deflector may be fastened to at least one of the pony rod and the clamp.

7. A method of coupling a pony rod and a plunger for operation within a fluid end, comprising:
    locating a first flange portion on the plunger, the first flange portion extending from a first abutment surface, the first flange portion being an integral part with the plunger;
    locating a second flange portion on the pony rod, the second flange portion extending from a second abutment surface, the second flange portion being an integral part with the pony rod;
    spacing the first flange portion from the second flange portion;
    positioning a clamp between the first abutment surface and the second abutment surface,
    securing a first end of the clamp to the first flange portion and securing a second end to the second flange portion in a non-threaded relationship;
    engaging the clamp to the first flange portion with a lip and a recess position about a first end portion of the clamp;
    engaging the clamp to the second flange portion with a lip and a recess position about a second end portion of the clamp;
    deflecting a fluid stream around the clamp with a deflector having an angled surface, the deflector having a first cavity at a first end and a second cavity at a second end, the first end and the second end having different diameter sizes; and
    aligning the plunger with the pony rod with an alignment pin configured to extend through the clamp.

8. The method of claim 7, further comprising:
    retracting the pony rod away from the fluid end.

9. The method of claim 8, further comprising:
    inserting the plunger into the fluid end coaxially with the centerline.

10. The method of claim 7, wherein at least one of the first flange portion is integrally coupled with the plunger and the second flange portion is integrally coupled with the pony rod.

11. The method of claim 7, inserting an alignment pin into a stud bore to align the plunger with the pony rod.

12. The method of claim 7, further comprising:
    securing a deflector to the clamp configured to deflect pressurized fluid escaping from the a pumping chamber in the fluid end.

13. The method of claim 12, wherein the deflector is located about the clamp to permit oscillation of the plunger within the fluid end without contacting the fluid end.

14. The method of claim 7, wherein the clamp is spaced from the first abutment surface and the second abutment surface when engaged with the first flange portion and the second flange portion.

* * * * *